US012637074B2

(12) United States Patent
Iba et al.

(10) Patent No.: US 12,637,074 B2
(45) Date of Patent: May 26, 2026

(54) VEHICLE CONTROL APPARATUS, VEHICLE CONTROL METHOD, AND VEHICLE FOLLOWING RUNNING SYSTEM

(71) Applicant: Hitachi Astemo, Ltd., Hitachinaka (JP)

(72) Inventors: Tatsuya Iba, Hitachinaka (JP); Kentaro Ueno, Hitachinaka (JP); Hiroshi Ito, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 189 days.

(21) Appl. No.: 17/630,039

(22) PCT Filed: Jun. 22, 2020

(86) PCT No.: PCT/JP2020/024330
§ 371 (c)(1),
(2) Date: Jan. 25, 2022

(87) PCT Pub. No.: WO2021/019955
PCT Pub. Date: Feb. 4, 2021

(65) Prior Publication Data
US 2022/0250621 A1     Aug. 11, 2022

(30) Foreign Application Priority Data

Jul. 26, 2019     (JP) ................................. 2019-137604

(51) Int. Cl.
*B60W 30/165*        (2020.01)
*B60W 10/04*         (2006.01)
(Continued)

(52) U.S. Cl.
CPC .......... *B60W 30/165* (2013.01); *B60W 10/04* (2013.01); *B60W 10/18* (2013.01);
(Continued)

(58) Field of Classification Search
CPC .... B60W 30/165; B60W 10/04; B60W 10/18; B60W 2554/4041; B60W 2554/804;
(Continued)

(56) References Cited

U.S. PATENT DOCUMENTS

| 6,401,024 | B1 * | 6/2002 | Tange | ................... | B60W 30/16 |
| | | | | | 180/170 |
| 2012/0277967 | A1 * | 11/2012 | Isaji | ..................... | B60W 30/16 |
| | | | | | 701/96 |

(Continued)

FOREIGN PATENT DOCUMENTS

| JP | 2010-102660 A | 5/2010 |
| JP | 2010-166635 A | 7/2010 |

(Continued)

OTHER PUBLICATIONS

Japanese-language Office Action issued in Japanese Application No. 2019-137604 dated Jan. 17, 2023 with English translation (eight (8) pages).

(Continued)

*Primary Examiner* — Navid Z. Mehdizadeh
*Assistant Examiner* — Oliver Tan
(74) *Attorney, Agent, or Firm* — Crowell & Moring LLP

(57) ABSTRACT

According to one aspect of the present invention, a vehicle control apparatus mounted on a lead vehicle sets a smaller value of a first acceleration limit value determined based on specifications regarding running of a first following vehicle and a basic acceleration limit value determined based on specifications regarding running of the lead vehicle as a set acceleration limit value of the lead vehicle, and outputs an acceleration instruction for controlling a braking apparatus or a driving apparatus after limiting it according to the set acceleration limit value.

12 Claims, 14 Drawing Sheets

(51) Int. Cl.
    *B60W 10/18*         (2012.01)
    *G08G 1/00*         (2006.01)

(52) U.S. Cl.
    CPC ....... *G08G 1/22* (2013.01); *B60W 2554/4041*
        (2020.02); *B60W 2554/802* (2020.02); *B60W*
        *2554/804* (2020.02); *B60W 2710/18* (2013.01);
        *B60W 2720/106* (2013.01)

(58) Field of Classification Search
    CPC ....... B60W 2554/802; B60W 2710/18; B60W
        2720/106; G08G 1/22
    See application file for complete search history.

(56) References Cited

U.S. PATENT DOCUMENTS

| | | | |
|---|---|---|---|
| 2013/0041567 A1 | 2/2013 | Yamashiro | |
| 2013/0080041 A1* | 3/2013 | Kumabe | G05D 1/024 |
| | | | 701/117 |
| 2013/0124064 A1* | 5/2013 | Nemoto | B60K 31/0058 |
| | | | 701/1 |
| 2019/0171226 A1* | 6/2019 | Kim | G08G 1/22 |
| 2020/0035104 A1* | 1/2020 | Bergquist | G05D 1/0295 |
| 2020/0282990 A1* | 9/2020 | Sato | B60W 30/12 |
| 2020/0398839 A1* | 12/2020 | Ito | H01Q 3/24 |
| 2021/0232157 A1* | 7/2021 | Dieckmann | G05D 1/0293 |

FOREIGN PATENT DOCUMENTS

| | | | | | |
|---|---|---|---|---|---|
| JP | | 2013-37621 | A | 2/2013 | |
| JP | | 2015-20502 | A | 2/2015 | |
| JP | | 2019-77409 | A | 5/2019 | |
| WO | WO 2016/117311 | A1 | | 7/2016 | |
| WO | WO-2018043753 | A1 * | 3/2018 | .......... | B60W 30/165 |

OTHER PUBLICATIONS

English translation of document C2 (Japanese-language Written Opinion (PCT/ISA/237) filed on Jan. 25, 2022) issued in PCT Application No. PCT/JP2020/024330 dated Sep. 1, 2020 (four (4) pages).

English translation of document B1 (JP 2015-20502 A filed on Jan. 25, 2022) (35 pages).

International Search Report (PCT/ISA/210) issued in PCT Application No. PCT/JP2020/024330 dated Sep. 1, 2020 with English translation (four (4) pages).

Japanese-language Written Opinion (PCT/ISA/237) issued in PCT Application No. PCT/JP2020/024330 dated Sep. 1, 2020 (four (4) pages).

\* cited by examiner

Fig. 3

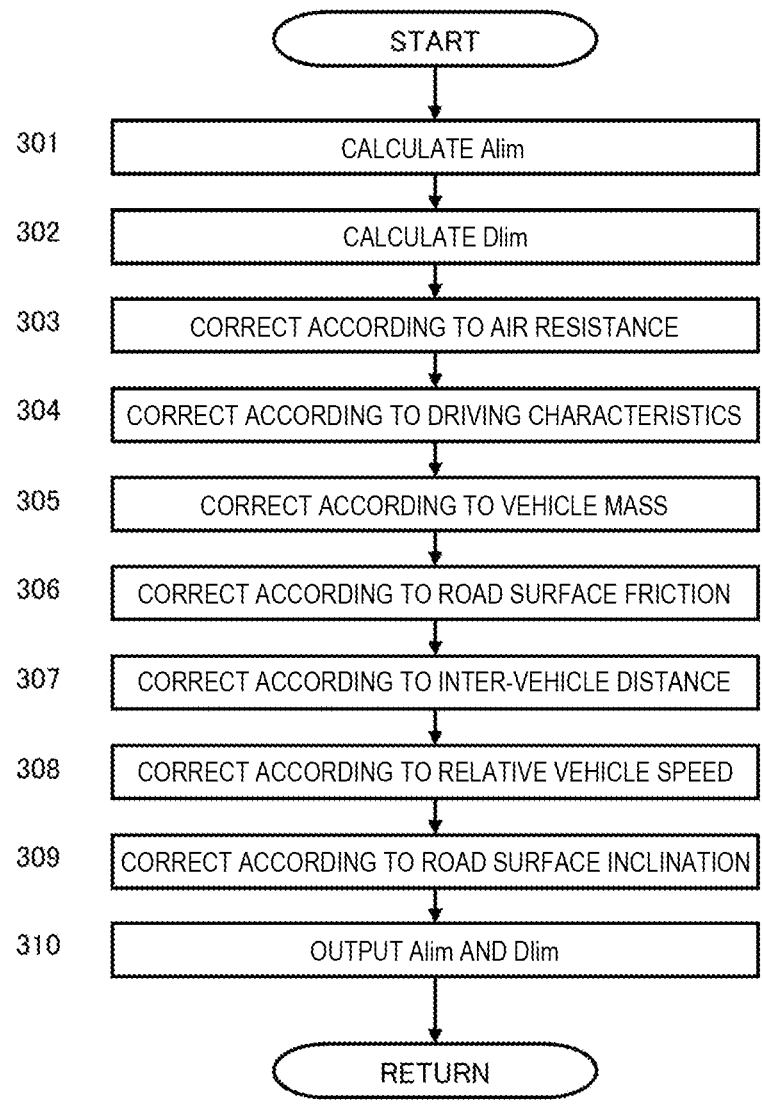

START

301    CALCULATE Alim

302    CALCULATE Dlim

303    CORRECT ACCORDING TO AIR RESISTANCE

304    CORRECT ACCORDING TO DRIVING CHARACTERISTICS

305    CORRECT ACCORDING TO VEHICLE MASS

306    CORRECT ACCORDING TO ROAD SURFACE FRICTION

307    CORRECT ACCORDING TO INTER-VEHICLE DISTANCE

308    CORRECT ACCORDING TO RELATIVE VEHICLE SPEED

309    CORRECT ACCORDING TO ROAD SURFACE INCLINATION

310    OUTPUT Alim AND Dlim

RETURN

START

451   CALCULATE Alimb

452   CALCULATE Dlimb

453   CORRECT ACCORDING TO AIR RESISTANCE

454   CORRECT ACCORDING TO DRIVING CHARACTERISTICS

455   CORRECT ACCORDING TO VEHICLE MASS

456   CORRECT ACCORDING TO ROAD SURFACE FRICTION

457   CORRECT ACCORDING TO ROAD SURFACE INCLINATION

458   OUTPUT Alimb AND Dlimb

RETURN

VEHICLE CONTROL APPARATUS, VEHICLE CONTROL METHOD, AND VEHICLE FOLLOWING RUNNING SYSTEM

TECHNICAL FIELD

The present invention relates to a vehicle control apparatus, a vehicle control method, and a vehicle following running system, and relates to a technique for causing a plurality of vehicles to carry out following running by non-mechanically connecting them.

BACKGROUND ART

PTL 1 discloses a running control apparatus that controls a braking/driving force so as to form a platoon with another vehicle running in the same traffic lane according to a set vehicle speed.

This running control apparatus changes its own set vehicle speed to a first upper limit value if determining that this vehicle is in a head running state that the vehicle is running at the head of the platoon, or changes its own set vehicle speed to a second upper limit value greater than the above-described first upper limit value if determining that this vehicle is not in the head running state.

CITATION LIST

Patent Literature

PTL 1: Japanese Patent Application Public Disclosure No. 2015-020502

SUMMARY OF INVENTION

Technical Problem

Then, in a case where a plurality of vehicles is caused to carry out following running by non-mechanically connecting them, each of the vehicles forming the platoon does not necessarily have an equivalent motion performance, and therefore setting the order in the platoon independently of a difference in the motion performance of each of the vehicles may lead to a reduction in the followability in the platoon running due to the difference in the motion performance among the vehicles.

Further, even when each of the vehicles forming the platoon has an equivalent motion performance, if a part of the vehicles forming the platoon is running on a slope or is carrying a great load amount, this impairs the motion performance of this part of the vehicles, thereby raising a possibility of reducing the followability in the platoon running.

Solution to Problem

An object of the present invention is to provide a vehicle control apparatus, a vehicle control method, and a vehicle following running system capable of improving followability in platoon running.

According to one aspect of the present invention, a control portion of a vehicle control apparatus mounted on a lead vehicle sets a smaller value of a first acceleration limit value determined based on specifications regarding running of a first following vehicle and a basic acceleration limit value determined based on specifications regarding running of the lead vehicle as a set acceleration limit value of the lead vehicle, and outputs an acceleration instruction for controlling a braking apparatus or a driving apparatus after limiting it according to the set acceleration limit value.

According to the one aspect of the present invention, the followability in the platoon running can be improved.

BRIEF DESCRIPTION OF DRAWINGS

FIG. 3 is a flowchart illustrating a procedure of processing for calculating an acceleration limit value in the following vehicle.

DESCRIPTION OF EMBODIMENTS

In the following description, embodiments of a vehicle control apparatus, a vehicle control method, and a vehicle following running system according to the present invention will be described with reference to the drawings.

First Embodiment

Figure 1:
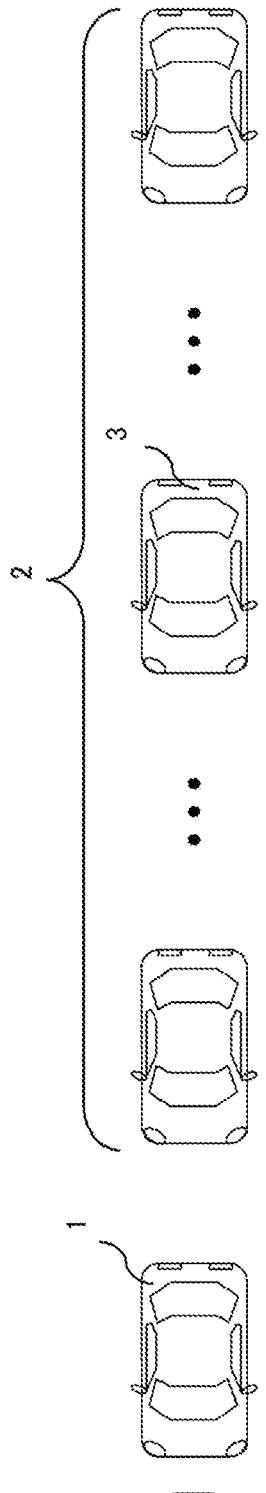
FIG. 1 illustrates a vehicle platoon including a lead vehicle and a plurality of following vehicles.

FIG. 1 illustrates a plurality of vehicles assembling a platoon in a vehicle following running system in which the plurality of vehicles carries out following running on a road by being non-mechanically connected.

The vehicles in the present disclosure are automobiles that run on a road.

The platoon illustrated in FIG. 1 includes a lead vehicle 1 running at the head of the platoon and a plurality of following vehicles 2 subsequent to the lead vehicle 1, and the plurality of following vehicles 2 runs so as to follow the lead vehicle 1 while maintaining the platoon according to inter-vehicle control of each of them.

Now, a first following vehicle 3, which is any one of the plurality of following vehicles 2, determines a first acceleration limit value for limiting the acceleration of the lead vehicle 1 based on the specifications regarding the running of the first following vehicle 3, and transmits it to the lead vehicle 1.

On the other hand, the lead vehicle 1 determines a basic acceleration limit value based on the specifications regarding its own running, and sets smaller one of the basic acceleration limit value and the first acceleration limit value acquired from the first following vehicle 3 as a set acceleration limit value of the lead vehicle 1.

Then, the lead vehicle 1 outputs an acceleration instruction for controlling its own braking apparatus or driving apparatus after limiting it based on the set acceleration limit value.

The above-described acceleration is a positive or negative acceleration, and the limitation on the positive acceleration in the lead vehicle 1 is conducted by an upper limit restriction on a driving force exerted by the driving apparatus and the limitation on the negative acceleration, i.e., a deceleration in the lead vehicle 1 is conducted by an upper limit restriction on a braking force exerted by the braking apparatus.

In other words, the vehicle following running system is configured to curb the acceleration or the deceleration of the lead vehicle 1 based on the specifications regarding the running of the first following vehicle 3, thereby preventing the first following vehicle 3 from failing to keep up with the acceleration or the deceleration of the preceding vehicle to thus fail to maintain a target inter-vehicle distance.

In the following description, the details of the vehicle following running system that limits the acceleration or the deceleration of the lead vehicle 1 will be described.

Figure 2:
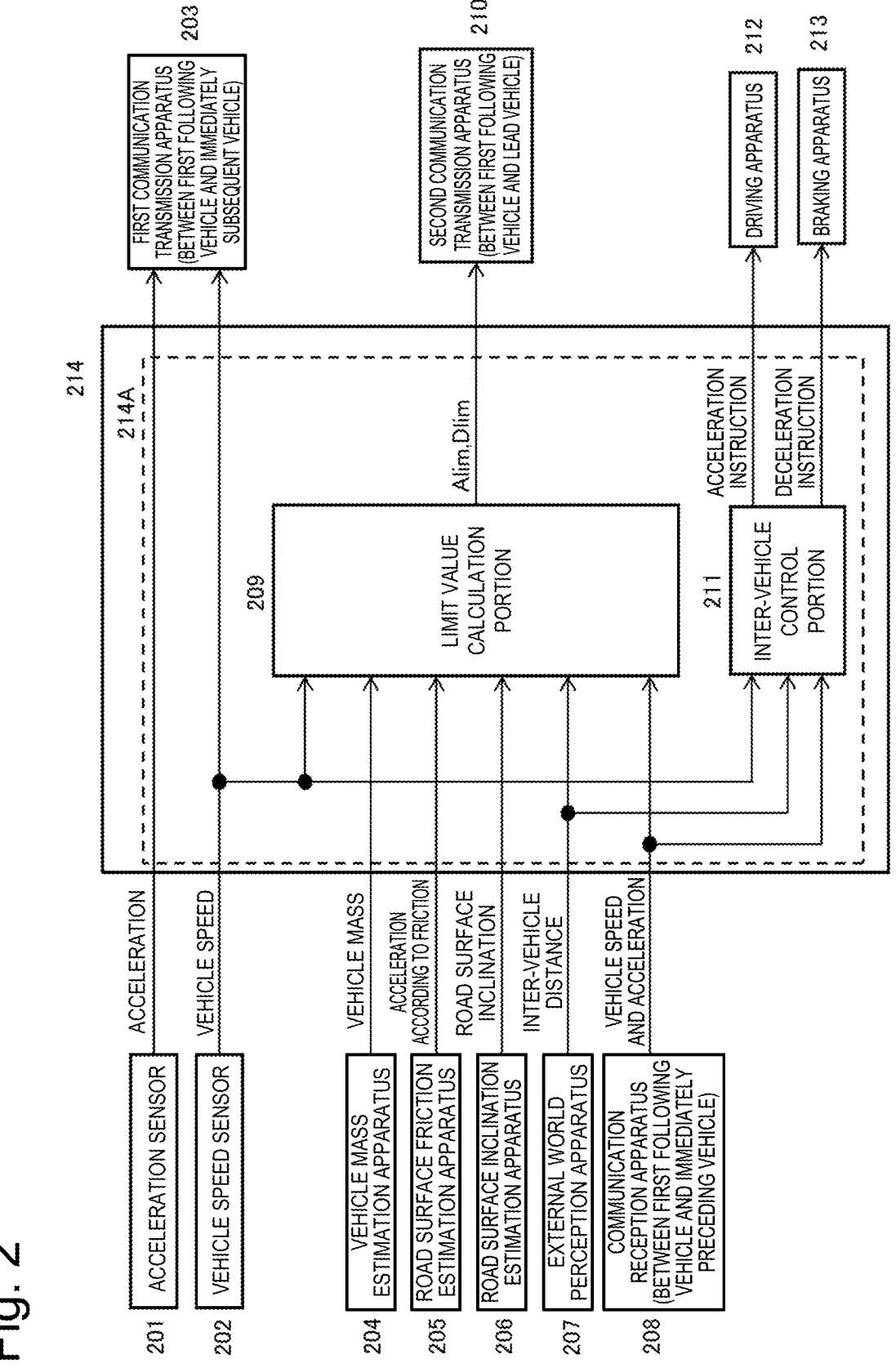
FIG. 2 is a block diagram illustrating a vehicle control system mounted on the following vehicle according to a first embodiment.

FIG. 2 is a block diagram illustrating one configuration of a vehicle control system mounted on the first following vehicle 3.

The vehicle control system of the first following vehicle 3 has a function of determining the first acceleration limit value for limiting the acceleration of the lead vehicle 1 based on the specifications regarding the running of the first following vehicle 3 and transmitting it to the lead vehicle 1, a function of controlling its own braking/driving force to follow a vehicle running immediately ahead of this first following vehicle 3 (hereinafter referred to as an immediately preceding vehicle), and a function of transmitting information regarding the running state of the first following vehicle 3 that a vehicle running immediately behind the first following vehicle 3 (hereinafter referred to as an immediately subsequent vehicle) uses to determine a braking/driving instruction value to follow the first following vehicle 3 to the immediately subsequent vehicle.

Now, the specifications regarding the running of the first following vehicle 3 that the vehicle control system of the first following vehicle 3 uses to calculate the first acceleration limit value include information regarding a maximum acceleration (a first maximum acceleration), which is the performance of the first following vehicle 3.

In the following description, the vehicle control system of the first following vehicle 3 will be described in detail.

The vehicle control system of the first following vehicle 3 includes an acceleration sensor 201, a vehicle speed sensor 202, a vehicle mass estimation apparatus 204, a road surface friction estimation apparatus 205, a road surface inclination estimation apparatus 206, an external world perception apparatus 207, and a communication reception apparatus 208 as apparatuses for acquiring various kinds of information.

Further, the vehicle control system of the first following vehicle 3 includes a vehicle control apparatus 214 equipped with a control portion 214A that makes a calculation based on the various kinds of information acquired by the above-described apparatuses 201, 202, and 204 to 208 and outputs a calculated result.

The vehicle control apparatus 214 is an electronic control apparatus mainly formed by a microcomputer including a processor, a memory, an I/O, and a bus connecting them.

The control portion 214A of the vehicle control apparatus 214 is formed by the microcomputer, and has functions as a limit value calculation portion 209 and an inter-vehicle control portion 211. The limit value calculation portion 209 calculates the first acceleration limit value to be transmitted to the lead vehicle 1. The inter-vehicle control portion 211 controls the inter-vehicle distance between this first following vehicle 3 and the immediately preceding vehicle.

Further, the vehicle control system of the first following vehicle 3 includes a first communication transmission apparatus 203, a second communication transmission apparatus 210, a driving apparatus 212, and a braking apparatus 213, which receive an output of the vehicle control apparatus 214.

In sum, the vehicle control apparatus 214 includes the control portion 214A that outputs the calculation result based on the input information to the driving apparatus 212 or the braking apparatus 213.

The acceleration sensor 201 measures the acceleration of the first following vehicle 3, and outputs a signal regarding the measured acceleration.

The vehicle control system of the first following vehicle 3 can include an acceleration estimation apparatus that estimates the acceleration of the first following vehicle 3 based on an output of the driving apparatus 212 or the braking apparatus 213 of the first following vehicle 3 and the vehicle specifications of the first following vehicle 3, instead of the acceleration sensor 201.

Further, the acceleration sensor 201 is provided to allow the immediately subsequent vehicle behind the first following vehicle 3 to use the information about the acceleration of the first following vehicle 3 in the inter-vehicle control between this immediately subsequent vehicle and the first following vehicle 3.

Therefore, in a case where the immediately subsequent vehicle behind the first following vehicle 3 performs the inter-vehicle control without use of the information about the acceleration of the first following vehicle 3 or in a case where the first following vehicle 3 is the last vehicle in the platoon, the acceleration sensor 201 can be omitted in the vehicle control system of the first following vehicle 3.

The vehicle speed sensor 202 measures the vehicle speed of the first following vehicle 3, and outputs a signal regarding the measured vehicle speed.

In a case where the vehicle control system of the first following vehicle 3 includes a control apparatus including a vehicle speed estimation portion that estimates the vehicle speed such as a vehicle behavior control apparatus represented by an anti-lock brake system, the vehicle control apparatus 214 can acquire a result of the estimation of the vehicle speed by the vehicle speed estimation portion.

Further, in a case where the limit value calculation portion 209 of the vehicle control apparatus 214 does not use the information about the vehicle speed of the first following vehicle 3 in the processing for calculating the first acceleration limit value and the immediately subsequent vehicle behind the first following vehicle 3 neither uses the information regarding the vehicle speed of the first following vehicle 3 in the inter-vehicle control, the vehicle speed sensor 202 can be omitted in the vehicle control system of the first following vehicle 3.

The first communication transmission apparatus 203 is a transmission apparatus used in communication between the first following vehicle 3 and the immediately subsequent vehicle behind the first following vehicle 3, and transmits a signal regarding the vehicle speed and the acceleration of the first following vehicle 3 to the immediately subsequent vehicle behind the first following vehicle 3 as the information regarding the running state of the first following vehicle 3.

For example, the first communication transmission apparatus 203 acquires a signal regarding the value of the acceleration measured by the acceleration sensor 201 and the value of the vehicle speed measured by the vehicle speed sensor 202, and transmits the acquired signal regarding the measured values to the immediately subsequent vehicle behind the first following vehicle 3.

In a case where the first following vehicle 3 includes the estimation portion that estimates at least one of the acceleration or the vehicle speed, the first communication transmission apparatus 203 can transmit a signal regarding the estimated value of the acceleration or the vehicle speed to the immediately subsequent vehicle behind the first following vehicle 3 instead of the signal regarding the acceleration or the vehicle speed.

Further, the communication partner of the first communication transmission apparatus 203 is not limited to the immediately subsequent vehicle behind the first following vehicle 3, as long as the vehicle following running system is configured in such a manner that the information regarding the vehicle speed and the acceleration of the first following vehicle 3 is transmitted to the immediately subsequent vehicle behind the first following vehicle 3 via the first communication transmission apparatus 203.

Further, in a case where the immediately subsequent vehicle behind the first following vehicle 3 does not use the information about the acceleration and the vehicle speed of the first following vehicle 3, which corresponds to the immediately preceding vehicle, or the first following vehicle 3 is the last vehicle in the platoon and does not have to transmit the information about the acceleration and the vehicle speed of the first following vehicle 3 to another vehicle, the first communication transmission apparatus 203 can be omitted in the vehicle control system of the first following vehicle 3.

The vehicle mass estimation apparatus 204 estimates the vehicle mass of the first following vehicle 3, and outputs a signal regarding the estimated vehicle mass.

The vehicle mass estimation apparatus 204 can be configured to, when a user of the platoon or the first following vehicle 3 issues an instruction indicating a load amount of the first following vehicle 3 via a human machine interface such as a switch mounted on the first following vehicle 3 by specifying a rough index such as heavy, middle, and light, output the signal according to this instruction.

Further, in a case where the limit value calculation portion 209 of the vehicle control apparatus 214 does not use information about the vehicle mass of the first following vehicle 3 in the processing for calculating the first acceleration limit value, the vehicle mass estimation apparatus 204 can be omitted in the vehicle control system of the first following vehicle 3.

The road surface friction estimation apparatus 205 estimates the acceleration according to the friction of the road surface on which the first following vehicle 3 runs, and outputs a signal regarding the estimated acceleration.

At this time, the road surface friction estimation apparatus 205 can estimate a frictional coefficient of the road surface and determine a value equivalent to the acceleration by multiplying the estimated frictional coefficient by a gravitational acceleration.

In a case where the limit value calculation portion 209 of the vehicle control apparatus 214 does not use information about the road surface friction in the processing for calculating the first acceleration limit value, the road surface friction estimation apparatus 205 can be omitted in the vehicle control system of the first following vehicle 3.

The road surface inclination estimation apparatus 206 estimates an inclination in the longitudinal direction of the vehicle on the road surface where the first following vehicle 3 runs, and outputs a signal regarding the estimated road surface inclination.

When the traveling direction and the longitudinal direction of the first following vehicle 3 are different, such as when the first following vehicle 3 is steered, the road surface inclination estimation apparatus 206 can determine an inclination corresponding to the traveling direction of the first following vehicle 3 with use of the inclination of the road surface in the longitudinal direction of the vehicle and the inclination of the road surface in the lateral direction of the vehicle.

In a case where the limit value calculation portion 209 of the vehicle control apparatus 214 does not use information about the road surface inclination in the processing for calculating the first acceleration limit value, the road surface inclination estimation apparatus 206 can be omitted in the vehicle control system of the first following vehicle 3.

The external world perception apparatus 207 is an apparatus equipped with, for example, a camera, a radar, or a sonar, and determines the inter-vehicle distance between the first following vehicle 3 and the immediately preceding vehicle ahead of the first following vehicle 3 and outputs a signal regarding the determined inter-vehicle distance.

In a case where the external world perception apparatus 207 can acquire positional information such as the latitude and the longitude of the first following vehicle 3 from the GPS (Global Positioning System) or the like and can also acquire positional information such as the latitude and the longitude of the immediately preceding vehicle ahead of the first following vehicle 3 via the communication reception apparatus 208, the external world perception apparatus 207 can determine the inter-vehicle distance based on the positional information of the first following vehicle 3 and the positional information of the immediately preceding vehicle.

The communication reception apparatus 208 is a reception apparatus in communication between the first following vehicle 3 and the immediately preceding vehicle that allows the first following vehicle 3 to acquire the information regarding the running state of the immediately preceding vehicle, and receives the signal regarding the vehicle speed and the acceleration of the immediately preceding vehicle that is transmitted from the immediately preceding vehicle.

For example, in a case where the immediately preceding vehicle includes the vehicle speed sensor and the acceleration sensor, the communication reception apparatus 208 acquires the signal regarding the measured values of the vehicle speed and the acceleration with respect to the immediately preceding vehicle.

Alternatively, in a case where the immediately preceding vehicle includes the estimation portion that estimates at least one of the acceleration or the vehicle speed, the communication reception apparatus 208 can acquire the signal regarding the estimated value of the acceleration or the vehicle speed of the immediately preceding vehicle instead of the signal regarding the measured value of the acceleration or the vehicle speed of the immediately preceding vehicle.

Further, the actual communication partner of the communication reception apparatus 208 is not limited to the immediately preceding vehicle, as long as the communication reception apparatus 208 can receive information regarding the vehicle speed and the acceleration of the immediately preceding vehicle.

Further, in a case where the inter-vehicle control portion 211 of the vehicle control apparatus 214 does not use the information about the vehicle speed and the acceleration of the immediately preceding vehicle in the inter-vehicle control, the communication reception apparatus 208 can be omitted in the vehicle control system of the first following vehicle 3.

The limit value calculation portion 209 calculates the first acceleration limit value for curbing the acceleration of the lead vehicle 1 based on the specifications regarding the running of the first following vehicle 3, and outputs a signal regarding the calculated first acceleration limit value.

The first acceleration limit value includes an acceleration limit value Alim for curbing a positive acceleration of the lead vehicle 1, i.e., an acceleration in a direction for increasing the speed and a deceleration limit value Dlim for curbing a negative acceleration of the lead vehicle 1, i.e., a deceleration that is an acceleration in a direction for reducing the speed. The acceleration limit value Alim and the deceleration limit value Dlim are each an upper limit value on an absolute value of a speed change amount per unit time.

Processing for calculating the acceleration limit value Alim and the deceleration limit value Dlim as the first acceleration limit value by the limit value calculation portion 209 will be described below in detail.

The vehicle following running system according to the present embodiment prevents the lead vehicle 1 from being driven at an acceleration or a deceleration exceeding the acceleration performance or the deceleration performance of the first following vehicle 3 by limiting the acceleration of the lead vehicle 1 based on the acceleration limit value Alim or limiting the deceleration of the lead vehicle 1 based on the deceleration limit value Dlim, thereby improving the followability of the first following vehicle 3 to the lead vehicle 1.

The second communication transmission apparatus 210 is a transmission apparatus between the first following vehicle 3 and the lead vehicle 1, and transmits a signal regarding the acceleration limit value Alim and the deceleration limit value Dlim as the first acceleration limit value calculated by the limit value calculation portion 209 to the lead vehicle 1.

The actual communication partner of the second communication transmission apparatus 210 is not limited to the lead vehicle 1, as long as the signal regarding the acceleration limit value Alim and the deceleration limit value Dlim calculated by the limit value calculation portion 209 of the first following vehicle 3 is eventually transmitted to the lead vehicle 1.

The inter-vehicle control portion 211 outputs an acceleration instruction value Acom to the driving apparatus 212 of the first following vehicle 3 and outputs a deceleration instruction value Dcom to the braking apparatus 213 of the first following vehicle 3 to keep the inter-vehicle distance between the first following vehicle 3 and the immediately preceding vehicle at a target value in the platoon running.

Now, the target value of the inter-vehicle distance not only may be a constant value but also may be a variable value. More specifically, a distance variable according to a change in the running state may be used as the target value of the inter-vehicle distance, like, for example, increasing the target value of the inter-vehicle distance according to an increase in the vehicle speed.

The inter-vehicle control portion 211 calculates the acceleration instruction value Acom according to, for example, an equation (1).

$$Acom = Atar + Kx \times \Delta x + Kv \times \Delta v \tag{1}$$

In the equation (1), $\Delta x$ represents the difference between the actual inter-vehicle distance and the target value ($\Delta x$=the actual inter-vehicle distance−the target value), and is calculated as a positive value when the actual inter-vehicle distance is longer than the target value while being calculated as a negative value when the actual inter-vehicle distance is shorter than the target value.

Further, $\Delta v$ represents the difference between the vehicle speed of the immediately preceding vehicle and the vehicle speed of the first following vehicle 3 (the vehicle speed of the subject vehicle) ($\Delta v$=the vehicle speed of the immediately preceding vehicle−the vehicle speed of the subject vehicle), and is calculated as a positive value when the vehicle speed of the immediately preceding vehicle is higher than the vehicle speed of the subject vehicle while being calculated as a negative value when the vehicle speed of the immediately preceding vehicle is lower than the vehicle speed of the subject vehicle.

Further, Atar represents the acceleration of the immediately preceding vehicle ahead of the first following vehicle 3, and is provided as a positive value at the time of acceleration when the vehicle speed of the immediately preceding vehicle increases while being provided as a negative value at the time of deceleration when the vehicle speed of the immediately preceding vehicle reduces.

Further, Kx and Kv represent positive constant gains, and are control constants stored in the memory of the microcomputer (the control portion 214A).

When the acceleration instruction value Acom calculated according to the equation (1) is a positive value, the inter-vehicle control portion 211 outputs the acceleration instruction value Acom to the driving apparatus 212 directly as the acceleration instruction value Acom.

On the other hand, when the acceleration instruction value Acom calculated according to the equation (1) is a negative value, the inter-vehicle control portion 211 calculates the deceleration instruction value Dcom as Dcom=|Acom| and outputs the calculated deceleration instruction value Dcom to the braking apparatus 213.

The equation for calculating the acceleration instruction value Acom by the inter-vehicle control portion 211 is not limited to the equation (1), and the inter-vehicle control portion 211 can employ, for example, an equation including a derivative term or an integral term, an equation using the information about the acceleration Atar of the immediately preceding vehicle or the vehicle speed of the immediately preceding vehicle after processing it, or an equation not using them, according to a control request as appropriate.

Further, the inter-vehicle control portion 211 can define respective settable ranges of the acceleration instruction value Acorn to be output to the driving apparatus 212 and the deceleration instruction value Dcom to be output to the braking apparatus 213 for a safety reason or the like, and determine the acceleration instruction value Acorn and the deceleration instruction value Dcom while limiting them within these settable ranges.

The settable ranges of the acceleration instruction value Acorn and the deceleration instruction value Dcom can be stored in the memory of the microcomputer as fixed values in advance, or the inter-vehicle control portion 211 can be configured to allow the user to specify an arbitrary value by operating a switch or the like.

The driving apparatus 212 controls a driving actuator such as a motor or an engine (an internal combustion engine) according to the input acceleration instruction Acorn.

The braking apparatus 213 controls a braking actuator such as a hydraulic brake according to the input deceleration instruction Dcom.

In this manner, the inter-vehicle control portion 211 of the first following vehicle 3 controls the braking/driving force of the first following vehicle 3 so as to keep the inter-vehicle distance between the first following vehicle 3 and the immediately preceding vehicle at the target value.

FIG. 3 is a flowchart illustrating a procedure for calculating the acceleration limit value Alim and the deceleration limit value Dlim by the limit value calculation portion 209 of the first following vehicle 3.

The limit value calculation portion 209 calculates the acceleration limit value Alim and the deceleration limit value Dlim based on the specifications regarding the running of the first following vehicle 3, and the specifications regarding the running of the first following vehicle 3 include the maximum acceleration and the maximum deceleration, the air resistance, the driving characteristics, the vehicle mass, the road surface friction, the inter-vehicle distance, the relative vehicle speed, and the road surface inclination.

First, in step S301, the limit value calculation portion 209 determines a maximum positive acceleration value achievable by the first following vehicle 3, i.e., a maximum value of an absolute value of a speed increase amount per unit time based on the information about the vehicle specifications of the first following vehicle 3, i.e., the performance of the driving apparatus 212 or the like as the maximum acceleration Amax, and sets the maximum acceleration Amax, which is the maximum acceleration performance of the first following vehicle 3, as the acceleration limit value Alim (the positive acceleration limit value).

In a case where the driving apparatus 212 of the first following vehicle 3 uses a motor as the driving actuator, the limit value calculation portion 209 calculates the maximum acceleration Amax, for example, according to an equation (2) with use of a maximum torque Tmmax of the motor, a speed reduction ratio G, a tire radius Rt, and a vehicle mass Mv.

$$Amax = (G \times Tmmax)/(Rt \times Mv) \qquad (2)$$

In a case where the maximum acceleration Amax cannot be calculated with use of the equation (2), for example, because a part of the variables used in the equation (2) is unknown, the limit value calculation portion 209 can employ a maximum acceleration value generated when the first following vehicle 3 is actually accelerated as the maximum acceleration Amax.

Alternatively, in a case where an upper limit value is set on the acceleration instruction value Acom to be fed to the driving apparatus 212 of this first following vehicle 3 in the inter-vehicle control, the limit value calculation portion 209 can employ this value as the maximum acceleration Amax.

On the other hand, in a case where the driving apparatus 212 of the first following vehicle 3 uses an engine as the driving actuator, the limit value calculation portion 209 calculates the maximum acceleration Amax, for example, according to an equation (3) with use of a maximum torque Temax of the engine, a maximum speed reduction ratio Gmax of the transmission, the tire radius Rt, and the vehicle mass Mv.

$$Amax = (Gmax \times Temax)/(Rt \times Mv) \qquad (3)$$

Even in the case where the engine is used as the driving actuator, the limit value calculation portion 209 can employ the maximum acceleration generated when the first following vehicle 3 is actually accelerated or the upper limit value on the acceleration instruction value Acom in the inter-vehicle control as the maximum acceleration Amax similarly to when the motor is used as the driving actuator.

Next, in step S302, the limit value calculation portion 209 determines a maximum negative acceleration value achievable by the first following vehicle 3, i.e., a maximum value of an absolute value of a speed reduction amount per unit time based on the information about the vehicle specifications of the first following vehicle 3, i.e., the performance of the braking apparatus 213 or the like as the maximum deceleration Dmax, and sets the maximum deceleration Dmax, which is the maximum deceleration performance of the first following vehicle 3, as the deceleration limit value Dlim (the negative acceleration limit value).

In a case where the braking apparatus 213 of the first following vehicle 3 uses a hydraulic brake as the braking actuator, the limit value calculation portion 209 calculates the maximum deceleration Dmax, for example, according to an equation (4) with use of a maximum hydraulic pressure Pmax of the hydraulic pressure generation apparatus, a frictional coefficient μp of the brake pad, a piston area Sp of the wheel cylinder, a brake effective radius Rb, the tire radius Rt, and the vehicle mass Mv.

$$Dmax = (8 \times \mu p \times Rb \times Sp \times Pmax)/(Rt \times Mv) \qquad (4)$$

In a case where the maximum deceleration Dmax cannot be calculated with use of the equation (4), for example, because the maximum hydraulic pressure Pmax of the hydraulic pressure generation apparatus used in the equation (4) is unknown, the limit value calculation portion 209 can employ a maximum deceleration value generated when the first following vehicle 3 is actually decelerated as the maximum deceleration Dmax.

Alternatively, in a case where an upper limit value is set on the deceleration instruction value Dcom to be fed to the braking apparatus 213 of this first following vehicle 3 in the inter-vehicle control (an upper limit value on the absolute value of the speed reduction amount per unit time), the limit value calculation portion 209 can employ this upper limit value on the deceleration instruction value Dcom as the maximum deceleration Dmax.

In this manner, the limit value calculation portion 209 sets the acceleration limit value Alim based on the maximum acceleration Amax in step S301, and sets the deceleration limit value Dlim based on the maximum deceleration Dmax in step S302.

Further, in step S303 and steps subsequent thereto, the limit value calculation portion 209 corrects the acceleration limit value Alim set based on the maximum acceleration Amax and the deceleration limit value Dlim set based on the maximum deceleration Dmax based on the running conditions such as the air resistance and the specifications regarding the running of the first following vehicle 3 such as the driving characteristics of the driving apparatus 212, thereby determining the final acceleration limit value Alim and deceleration limit value Dlim.

In step S303, the limit value calculation portion 209 estimates the air resistance applied to the first following vehicle 3 based on the vehicle speed of the first following vehicle 3, and corrects and updates the acceleration limit value Alim determined in step S301 and the deceleration limit value Dlim determined in step S302 according to the magnitude of the deceleration according to the estimated air resistance.

A polynomial equation or a conversion table including the vehicle speed as a variable is designed based on a result of measuring the air resistance using an experimental value using a real car or an estimated value from a simulation to estimate the vehicle speed based on the magnitude of the deceleration according to the air resistance.

Then, the limit value calculation portion 209 estimates the magnitude of the deceleration according to the air resistance based on the vehicle speed with use of this polynomial equation or conversion table.

At this time, the limit value calculation portion 209 sets the estimated magnitude of the deceleration, i.e., the absolute value of the speed reduction amount per unit time according to the air resistance as a correction value Dair according to the air resistance.

Then, in step S303, the limit value calculation portion 209 newly sets a result of subtracting the correction value Dair from the acceleration limit value Alim determined in step S301 as the acceleration limit value Alim (Alim←Alim−Dair).

More specifically, because the maximum acceleration Amax of the first following vehicle 3 reduces as the air resistance increases, the limit value calculation portion 209 corrects the acceleration limit value Alim determined in step S301 so as to reduce it by an amount corresponding to the correction amount Dair.

Further, in step S303, the limit value calculation portion 209 newly sets a result of adding the correction value Dair to the deceleration limit value Dlim determined in step S302 as the deceleration limit value Dlim (Dlim←Dlim+Dair).

More specifically, because a deceleration force due to the air resistance is added to the deceleration force exerted by the braking apparatus 213 and the deceleration achievable by the first following vehicle 3 increases at the time of deceleration accompanied by braking, the limit value calculation portion 209 corrects the deceleration limit value Dlim determined in step S302 so as to increase it by the amount corresponding to the correction value Dair.

Next, in step S304, the limit value calculation portion 209 corrects and updates the acceleration limit value Alim corrected based on the air resistance in step S303 according to the driving characteristics of the driving apparatus 212 that change according to the vehicle speed of the first following vehicle 3.

Generally, the driving force that can be output from the driving apparatus 212 reduces according to an increase in the vehicle speed.

For example, in the case where the driving apparatus 212 uses the motor as the driving actuator, the maximum output torque of the motor reduces according to an increase in the rotational speed of the motor [rpm], and this means that the maximum acceleration Amax of the first following vehicle 3 reduces according to the increase in the rotational speed of the motor, i.e., an increase in the vehicle speed.

Now, the limit value calculation portion 209 can determine the range of the reduction in the maximum acceleration Amax accompanying the change in the driving characteristics of the motor according to the vehicle speed based on the correlation between the rotational speed of the motor and the maximum motor torque, and the speed reduction ratio.

Alternatively, the limit value calculation portion 209 can determine the range of the reduction in the maximum acceleration Amax accompanying the increase in the rotational speed of the motor with use of a conversion table for determining the range of the reduction in the maximum acceleration Amax based on the vehicle speed that is designed from an experiment using a real car of the first following vehicle 3.

In the case where the limit value calculation portion 209 uses the correlation between the rotational speed of the motor and the maximum motor torque (the specifications of the motor inverter) when determining the range of the reduction in the maximum acceleration Amax, the limit value calculation portion 209 can acquire and use a state amount of the motor such as the rotational speed of the motor as necessary.

On the other hand, in the case where the driving apparatus 212 of the first following vehicle 3 uses an engine as the driving actuator, the output torque of the engine reduces according to an increase in the engine speed [rpm] and the speed reduction ratio of the transmission reduces according to the increase in the vehicle speed, and this means that the maximum acceleration Amax of the first following vehicle 3 reduces according to the increase in the vehicle speed.

Now, the limit value calculation portion 209 can determine the range of the reduction in the maximum acceleration Amax accompanying the change in the driving characteristics of the engine according to the vehicle speed based on the specifications of the engine or with use of a conversion table generated from an experimental value similarly to when the motor is used as the driving actuator.

In the case where the limit value calculation portion 209 determines the range of the reduction in the maximum acceleration Amax based on the specifications of the engine, the limit value calculation portion 209 can acquire and use a state amount of the engine such as the engine speed as necessary.

When the range of the reduction in the maximum acceleration Amax according to the driving characteristics of the driving apparatus 212 is used as a correction value Adrv according to the driving characteristics, in step S304, the limit value calculation portion 209 newly sets a result of subtracting the correction value Adrv from the acceleration limit value Alim determined in step S303 as the acceleration limit value Alim (Alim←Alim−Adrv).

The correction value Adrv corresponds to the range of the reduction in the maximum acceleration Amax according to the driving characteristics of the driving apparatus 212 as described above, and therefore the limit value calculation portion 209 does not correct the deceleration limit value Dlim using the correction value Adrv.

Next, in step S305, the limit value calculation portion 209 corrects and updates the acceleration limit value Alim updated in step S304 and the deceleration limit value Dlim updated in step S303 according to the vehicle mass of the first following vehicle 3.

For example, assuming that Mv represents a reference vehicle mass of the first following vehicle 3 when the first following vehicle 3 carries no load, and Mvest represents an estimated value of the actual vehicle mass of the first following vehicle 3, in step S305, the limit value calculation portion 209 newly sets Mv×Alim/Mvest as the acceleration limit value Alim and newly sets Mv×Dlim/Mvest as the deceleration limit value Dlim.

In other words, as the actual vehicle mass Mvest of the first following vehicle 3 becomes increasingly heavier than the reference vehicle mass Mv, the acceleration performance and the deceleration performance of the first following vehicle 3 reduce compared to when the vehicle mass is the reference vehicle mass Mv.

Therefore, the limit value calculation portion 209 corrects the acceleration limit value Alim and the deceleration limit value Dlim to further smaller values as the actual vehicle mass Mvest becomes increasingly heavier than the reference vehicle mass Mv.

Next, in step S306, the limit value calculation portion 209 corrects and updates the acceleration limit value Alim and the deceleration limit value Dlim updated in step S305 according to the friction of the road surface on which the first following vehicle 3 runs.

Vehicles cannot output a stronger driving force and braking force than the frictional force with the road surface, and therefore the upper limits on the achievable acceleration and deceleration reduce as the frictional coefficient of the road surface reduces.

Therefore, in step S306, the limit value calculation portion 209 compares the acceleration limit value Alim and the deceleration limit value Dlim updated in step S305 with an acceleration Afr according to the frictional force with the road surface, and sets ones of them having smaller values as the new acceleration limit value Alim and deceleration limit value Dlim (Alim=min(Alim, Afr) and Dlim=min(Dlim, Afr)).

Next, in step S307, the limit value calculation portion 209 corrects and updates the acceleration limit value Alim and the deceleration limit value Dlim updated in step S306 according to the inter-vehicle distance between the first following vehicle 3 and the immediately preceding vehicle, i.e., the preceding vehicle immediately ahead of the first following vehicle 3.

If the inter-vehicle distance between the first following vehicle 3 and the immediately preceding vehicle is longer than the target value, the limit value calculation portion 209 curbs the acceleration of the lead vehicle 1 by reducing the acceleration limit value Alim and also eases the limit on the deceleration of the lead vehicle 1 by increasing the deceleration limit value Dlim to allow the first following vehicle 3 to attain some leeway sufficient to realize a higher acceleration than the immediately preceding vehicle to shorten the inter-vehicle distance.

For example, the limit value calculation portion 209 calculates a correction value Ca for correcting the acceleration limit value Alim according to the inter-vehicle distance (i.e., the relative distance) according to an equation (5).

$$Ca = Kx \times |\Delta x| \qquad (5)$$

In the equation (5), $\Delta x$ represents the difference between the inter-vehicle distance and the target value, i.e., an error in the inter-vehicle distance, and Kx represents the preset positive constant gain.

In a case where the inter-vehicle control portion 211 determines the acceleration instruction value Acom and the deceleration instruction value Dcom by feedback control like the equation (1) based on the difference between the inter-vehicle distance and the target value, the limit value calculation portion 209 can use the value of the gain in the feedback control by the inter-vehicle control portion 211 directly as the gain Kx for determining the correction value Ca.

Further, the limit value calculation portion 209 also directly uses the correction value Ca for the acceleration limit value Alim to correct the deceleration limit value Dlim, as will be described below.

In step S307, if the inter-vehicle distance between the first following vehicle 3 and the immediately preceding vehicle is longer than the target value, the limit value calculation portion 209 sets a result of subtracting the correction value Ca determined according to the equation (5) from the acceleration limit value Alim determined in step S306 as the new acceleration limit value Alim (Alim=Alim−Ca).

Further, in step S307, if the inter-vehicle distance between the first following vehicle 3 and the immediately preceding vehicle is longer than the target value, the limit value calculation portion 209 sets a result of adding the correction value Ca determined according to the equation (5) to the deceleration limit value Dlim determined in step S306 as the new deceleration limit value Dlim (Dlim=Dlim+Ca).

On the other hand, if the inter-vehicle distance between the first following vehicle 3 and the immediately preceding vehicle is shorter than the target value, the limit value calculation portion 209 curbs the deceleration of the lead vehicle 1 by reducing the deceleration limit value Dlim and also eases the limit on the acceleration of the lead vehicle 1 by increasing the acceleration limit value Alim to allow the first following vehicle 3 to attain some leeway sufficient to realize a higher deceleration than the immediately preceding vehicle to widen the inter-vehicle distance.

At this time, the limit value calculation portion 209 also uses the correction value Ca used when the inter-vehicle distance is longer than the target value even when the inter-vehicle distance is shorter than the target value without changing it, and sets a result of adding the correction value Ca to the acceleration limit value Alim determined in step S306 as the new acceleration limit value Alim (Alim=Alim+Ca) and further sets a result of subtracting the correction value Ca from the deceleration limit value Dlim determined in step S306 as the new deceleration limit value Dlim (Dlim=Dlim−Ca).

Next, in step S308, the limit value calculation portion 209 corrects and updates the acceleration limit value Alim and the deceleration limit value Dlim updated in step S307 according to the relative vehicle speed (a relative speed) of the first following vehicle 3 to the immediately preceding vehicle ahead thereof, i.e., the preceding vehicle immediately ahead thereof.

If the relative vehicle speed is in a direction for increasing the inter-vehicle distance, the limit value calculation portion 209 eases the limit on the deceleration of the lead vehicle 1 by increasing the deceleration limit value Dlim while curbing the acceleration of the lead vehicle 1 by reducing the acceleration limit value Alim to achieve a higher acceleration than the immediately preceding vehicle to suppress the increase in the inter-vehicle distance.

For example, the limit value calculation portion 209 calculates a correction value Cb for correcting the acceleration limit value Alim according to the relative vehicle speed according to an equation (6).

$$Cb = Kv \times |\Delta v| \qquad (6)$$

In the equation (6), $\Delta v$ represents the relative vehicle speed, and Kv represents the preset positive constant gain.

In a case where the inter-vehicle control portion 211 determines the acceleration instruction value Acom and the deceleration instruction value Dcom by feedback control like the equation (1) based on the relative vehicle speed, the limit value calculation portion 209 can use the value of the gain in the feedback control by the inter-vehicle control portion 211 directly as the gain Kv for determining the correction value Cb.

Further, the limit value calculation portion 209 also directly uses the correction value Cb for the acceleration limit value Alim to correct the deceleration limit value Dlim, as will be described below.

If the relative vehicle speed is in a direction for increasing the inter-vehicle distance, the limit value calculation portion 209 sets a result of subtracting the correction value Cb determined according to the equation (6) from the acceleration limit value Alim determined in step S307 as the new acceleration limit value Alim (Alim=Alim−Cb) and further sets a result of adding the correction value Cb determined according to the equation (6) to the deceleration limit value Dlim determined in step S307 as the new deceleration limit value Dlim (Dlim=Dlim+Cb).

On the other hand, if the relative vehicle speed is in a direction for reducing the inter-vehicle distance, the limit value calculation portion 209 eases the limit on the acceleration of the lead vehicle 1 by increasing the acceleration limit value Alim while curbing the deceleration of the lead vehicle 1 by reducing the deceleration limit value Dlim to achieve a lower acceleration than the immediately preceding vehicle to reduce the magnitude of the relative vehicle speed.

At this time, the limit value calculation portion 209 also uses the correction value Cb used when the relative vehicle speed is in the direction for increasing the inter-vehicle distance even when the relative vehicle speed is in the direction for reducing the inter-vehicle distance without changing it, and sets a result of adding the correction value Cb to the acceleration limit value Alim determined in step S307 as the new acceleration limit value Alim (Alim=Alim+Cb) and further sets a result of subtracting the correction value Cb from the deceleration limit value Dlim determined in step S307 as the new deceleration limit value Dlim (Dlim=Dlim−Cb).

The above-described processing in step S307 and step S308 causes the acceleration limit value Alim and the deceleration limit value Dlim, which are the first acceleration limit value, to be corrected and set based on a first acceleration determined based on the first relative distance, which is the relative distance of the first following vehicle 3 to the preceding vehicle immediately ahead thereof, and the first relative speed, which is the relative vehicle speed of the first following vehicle 3 to the preceding vehicle immediately ahead thereof, and the first acceleration is included in the specifications regarding the running of the first following vehicle 3.

The above-described first acceleration is an acceleration regarding driving in the direction for increasing the speed (i.e., the positive acceleration) or an acceleration regarding braking in the direction for reducing the speed (i.e., the negative acceleration).

Next, in step S309, the limit value calculation portion 209 corrects the acceleration limit value Alim and the deceleration limit value Dlim updated in step S308 according to the inclination of the road surface on which the first following vehicle 3 runs, and outputs it.

If the inclination of the road surface is an upward direction with respect to the traveling direction of the first following vehicle 3, i.e., if the first following vehicle 3 is running on an upward slope, such an inclination makes it difficult to accelerate the first following vehicle 3 while making it easy to decelerate the first following vehicle 3. Therefore, the limit value calculation portion 209 eases the limit on the deceleration of the lead vehicle 1 by increasing the deceleration limit value Dlim while curbing the acceleration of the lead vehicle 1 by reducing the acceleration limit value Alim.

For example, the limit value calculation portion 209 calculates a correction value Cc for correcting the acceleration limit value Alim according to the road surface inclination according to an equation (7).

$$Cc = g \times \sin(|Gr|) \qquad (7)$$

In the equation (7), Gr represents the inclination of the road surface, and g represents the gravitational acceleration.

If the absolute value of the road surface inclination Gr is sufficiently small, the limit value calculation portion 209 can calculate the correction value Cc by approximating a sine function sin(|Gr|) to |Gr| to lessen the calculation load.

Further, the limit value calculation portion 209 also directly uses the correction value Cc for the acceleration limit value Alim to correct the deceleration limit value Dlim, as will be described below.

If the inclination of the road surface is in the upward direction with respect to the traveling direction of the first following vehicle 3, the limit value calculation portion 209 sets a result of subtracting the correction value Cc determined according to the equation (7) from the acceleration limit value Alim determined in step S308 as the new acceleration limit value Alim (Alim=Alim−Cc), and further sets a result of adding the correction value Cc determined according to the equation (7) to the deceleration limit value Dlim determined in step S308 as the new deceleration limit value Dlim (Dlim=Dlim+Cc).

On the other hand, if the inclination of the road surface is a downward direction with respect to the traveling direction of the first following vehicle 3, i.e., if the first following vehicle 3 is running on a downward slope, such an inclination makes it difficult to decelerate the first following vehicle 3 while making it easy to accelerate the first following vehicle 3. Therefore, the limit value calculation portion 209 curbs the deceleration of the lead vehicle 1 by reducing the deceleration limit value Dlim while easing the limit on the acceleration of the lead vehicle 1 by increasing the acceleration limit value Alim.

At this time, the limit value calculation portion 209 also uses the correction value Cc used when the inclination of the road surface is in the upward direction even when the inclination of the road surface is in the downward direction without changing it, and sets a result of adding the correction value Cc to the acceleration limit value Alim determined in step S308 as the new acceleration limit value Alim (Alim=Alim+Cc) and further sets a result of subtracting the correction value Cc from the deceleration limit value Dlim determined in step S308 as the new deceleration limit value Dlim (Dlim=Dlim—Cc).

Next, in step S310, the limit value calculation portion 209 outputs the acceleration limit value Alim and the deceleration limit value Dlim determined in the correction processing in step S309 to the second communication transmission apparatus 210 as the first acceleration limit value to transmit to the lead vehicle 1.

Then, the second communication transmission apparatus 210 transmits the signal regarding the acceleration limit value Alim and the deceleration limit value Dlim to the lead vehicle 1, thereby causing the acceleration or the deceleration of the lead vehicle to be limited based on the acceleration limit value Alim and the deceleration limit value Dlim.

In this manner, the limit value calculation portion 209 sets the basic values of the acceleration limit value Alim and the deceleration limit value Dlim based on the maximum acceleration Amax and the maximum deceleration Dmax as the specifications regarding the running of the first following vehicle 3, and corrects these basic values based on the air resistance, the driving characteristics of the driving apparatus 212, the vehicle mass, the road surface friction, the inter-vehicle distance, the relative vehicle speed, and the road surface inclination as the specifications regarding the running of the first following vehicle 3, thereby determining the final acceleration limit value Alim and deceleration limit value Dlim.

The limit value calculation portion 209 is not limited to the configuration that performs all of the processing procedures for correcting the acceleration limit value Alim and the deceleration limit value Dlim from step S303 to step S309, and can select and perform one or a plurality of correction processing procedure(s) highly contributive to maintaining the platoon among the correction processing procedures from step S303 to step S309.

Further, the limit value calculation portion 209 is not limited to performing step S303 to step S309 in the order illustrated in FIG. 3, and can perform step S303 to step S309 in a switched order.

Further, the limit value calculation portion 209 is not limited to the configuration that corrects the basic values of the acceleration limit value Alim and the deceleration limit value Dlim determined based on the maximum acceleration Amax and the maximum deceleration Dmax according to the air resistance and the like, as long as the limit value calculation portion 209 is configured to determine the acceleration limit value Alim and the deceleration limit value Dlim based on the specifications regarding the running of the first following vehicle 3 such as the maximum acceleration Amax and the maximum deceleration Dmax, and the air resistance.

Figure 4:
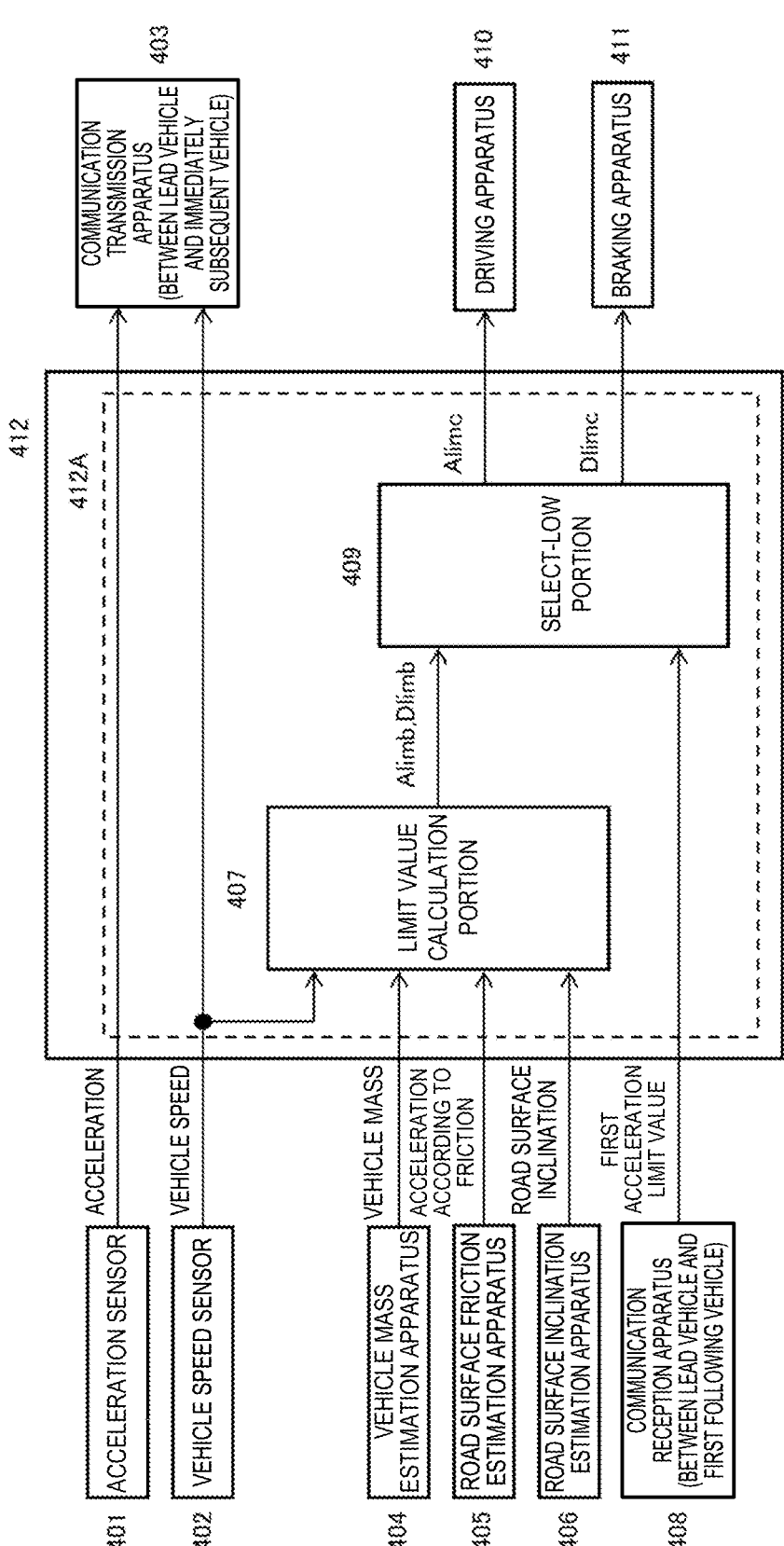
FIG. 4 is a block diagram illustrating a vehicle control system mounted on the lead vehicle according to the first embodiment.

FIG. 4 is a block diagram illustrating one configuration of a vehicle control system mounted on the lead vehicle 1.

The vehicle control system of the lead vehicle 1 has a function of determining a basic acceleration limit value Alimb and a basic deceleration limit value Dlimb as a basic acceleration/deceleration limit value based on the specifications regarding the running of the lead vehicle 1, a function of determining a set acceleration limit value Alimc and a set deceleration limit value Dlimc as a set acceleration limit value by comparing the basic acceleration limit value Alimb and the basic deceleration limit value Dlimb with the acceleration limit value Alim and the deceleration limit value Dlim determined by the first following vehicle 3, and a function of limiting the braking/driving force of the lead vehicle 1 according to the set acceleration limit value Alimc and the set deceleration limit value Dlimc.

The vehicle control system of the lead vehicle 1 includes an acceleration sensor 401, a vehicle speed sensor 402, a vehicle mass estimation apparatus 404, a road surface friction estimation apparatus 405, a road surface inclination estimation apparatus 406, and a communication reception apparatus 408 as apparatuses for acquiring various kinds of information.

Further, the vehicle control system of the lead vehicle 1 includes a vehicle control apparatus 412 equipped with a control portion 412A that makes a calculation based on the various kinds of information acquired by the above-described apparatuses 401, 402, and 404 to 408 and outputs a calculated result.

The vehicle control apparatus 412 is an electronic control apparatus mainly formed by a microcomputer including a processor, a memory, an I/O, and a bus connecting them.

The control portion 412A of the vehicle control apparatus 412 is formed by the microcomputer and has functions as a limit value calculation portion 407 and a select-low portion 409.

Further, the vehicle control system of the lead vehicle 1 includes a communication transmission apparatus 403, a driving apparatus 410, and a braking apparatus 411 that receive an output from the vehicle control apparatus 412.

The above-described acceleration sensor 401, vehicle speed sensor 402, vehicle mass estimation apparatus 404, road surface friction estimation apparatus 405, and road surface inclination estimation apparatus 406 are apparatuses that identify the acceleration, the vehicle speed, the vehicle mass, the road surface friction, and the road surface inclination of the lead vehicle 1.

Although the targeted vehicle is different, they are apparatuses having similar functions to the acceleration sensor 201, the vehicle speed sensor 202, the vehicle mass estimation apparatus 204, the road surface friction estimation apparatus 205, and the road surface inclination estimation apparatus 206 included in the first following vehicle 3, and therefore the detailed descriptions thereof will be omitted herein.

The communication transmission apparatus 403 is a transmission apparatus used in communication between the lead vehicle 1 and the immediately subsequent vehicle behind the lead vehicle 1, and transmits a signal regarding the vehicle speed and the acceleration of the lead vehicle 1 to the immediately subsequent vehicle as information regarding the running state of the lead vehicle 1.

The immediately subsequent vehicle behind the lead vehicle 1 controls the inter-vehicle distance between this immediately subsequent vehicle and the lead vehicle 1, which corresponds to the immediately preceding vehicle, with use of the information about the vehicle speed and the acceleration of the lead vehicle 1.

If the first following vehicle 3 runs immediately behind the lead vehicle 1, the communication partner of the communication transmission apparatus 403 is the first following vehicle 3.

Then, the communication reception apparatus 208 receives the signal regarding the vehicle speed and the acceleration of the lead vehicle 1, and the inter-vehicle control portion 211 controls the inter-vehicle distance between the first following vehicle 3 and the lead vehicle 1, which corresponds to the immediately preceding vehicle, with use of the information about the vehicle speed and the acceleration of the lead vehicle 1.

In a case where the lead vehicle 1 includes an estimation portion that estimates at least one of the acceleration and the vehicle speed, the communication transmission apparatus 403 can transmit a signal regarding the estimated value of the acceleration or the vehicle speed to the immediately subsequent vehicle behind the lead vehicle 1 instead of the signal regarding the acceleration or the vehicle speed.

Further, the communication partner of the communication transmission apparatus 403 is not limited to the immediately subsequent vehicle behind the lead vehicle 1, as long as the vehicle following running system is configured in such a manner that the information regarding the vehicle speed and the acceleration of the lead vehicle 1 is transmitted to the immediately subsequent vehicle behind the lead vehicle 1 via the communication transmission apparatus 403.

Further, in a case where the immediately subsequent vehicle behind the lead vehicle 1 does not use the information about the vehicle speed and the acceleration of the lead vehicle 1, which corresponds to the immediately preceding vehicle, in the inter-vehicle control, the communication transmission apparatus 403 can be omitted in the vehicle control system of the lead vehicle 1.

The limit value calculation portion 407 determines the basic acceleration limit value based on the specifications regarding the running of the lead vehicle 1 and outputs it.

The above-described basic acceleration limit value includes a basic acceleration limit value Alimb for curbing a positive acceleration of the lead vehicle 1, i.e., an acceleration in the direction for increasing the speed and a basic deceleration limit value Dlimb for curbing a negative acceleration of the lead vehicle 1, i.e., a deceleration that is an acceleration in the direction for reducing the speed. The basic acceleration limit value Alimb and the basic deceleration limit value Dlimb are each an upper limit value on an absolute value of a speed change amount per unit time.

Figure 5:
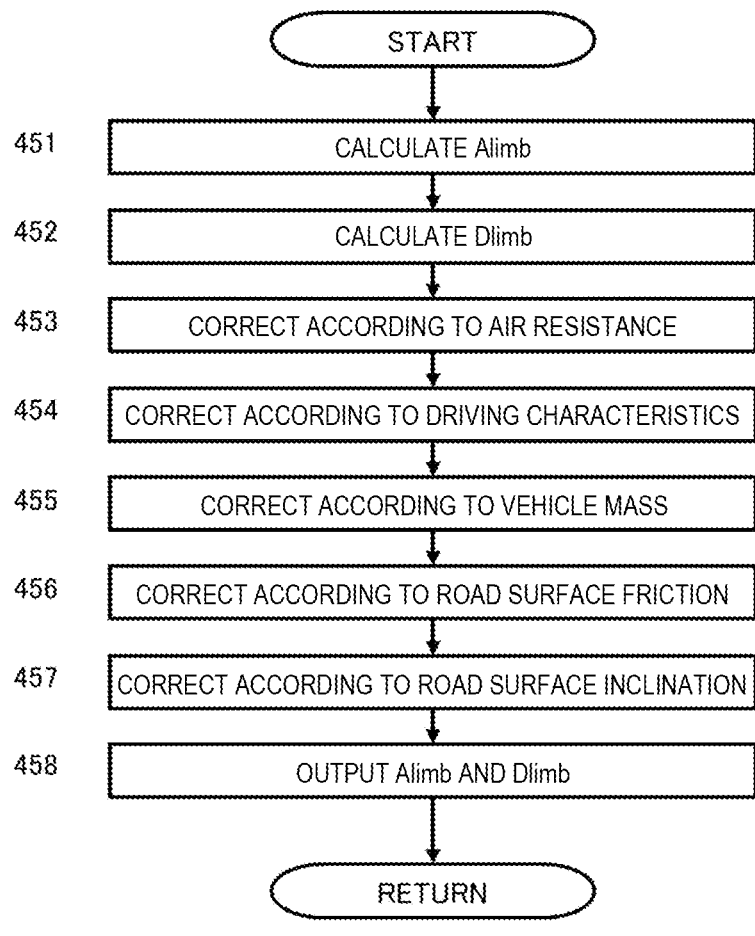
FIG. 5 is a flowchart illustrating a procedure of processing for calculating a set acceleration limit value in the lead vehicle.

FIG. 5 is a flowchart illustrating a procedure for calculating the basic acceleration limit value Alimb and the basic deceleration limit value Dlimb by the limit value calculation portion 407.

The procedure for calculating the basic acceleration limit value Alimb and the basic deceleration limit value Dlimb by the limit value calculation portion 407 illustrated in the flowchart of FIG. 5 is performed in a generally similar manner to the flowchart of FIG. 3 except for the target vehicle switched from the first following vehicle 3 to the lead vehicle 1 and the omission of the correction according to the inter-vehicle distance in step S307 and the correction according to the relative vehicle speed in step S308.

In the following description, the calculation procedure illustrated in the flowchart of FIG. 5 will be outlined.

In step S451, the limit value calculation portion 407 determines a maximum acceleration Atvmax, which is a maximum positive acceleration value of the lead vehicle 1, based on, for example, the information about the vehicle specifications of the lead vehicle 1, and sets the determined maximum acceleration Atvmax as the basic acceleration limit value Alimb (the positive acceleration limit value).

Next, in step S452, the limit value calculation portion 407 determines a maximum deceleration Dtvmax, which is a maximum negative acceleration value of the lead vehicle 1, based on, for example, the information about the vehicle specifications of the lead vehicle 1, and sets the determined maximum deceleration Dtvmax as the basic deceleration limit value Dlimb (the negative acceleration limit value).

Next, in step S453, the limit value calculation portion 407 estimates the magnitude of the deceleration according to the air resistance based on the vehicle speed of the lead vehicle 1, and sets a correction value Dtvair for collecting the basic acceleration limit value Alimb and the basic deceleration limit value Dlimb based on the estimated deceleration.

Then, the limit value calculation portion 407 newly sets a result of subtracting the correction value Dtvair from the basic acceleration limit value Alimb determined in step S451 as the basic acceleration limit value Alimb (Alimb←Alimb−Dtvair) and further newly sets a result of adding the correction value Dtvair to the basic deceleration limit value Dlimb determined in step S452 as the basic deceleration limit value Dlimb (Dlimb←Dlimb+Dtvair).

Next, in step S454, the limit value calculation portion 407 corrects the basic acceleration limit value Alimb determined in step S453 based on a reduction in the driving force that the driving apparatus 410 of the lead vehicle 1 can output according to an increase in the vehicle speed.

The limit value calculation portion 407 determines the range of the reduction in the maximum acceleration Atvmax according to the driving characteristics of the driving apparatus 410 as a correction value Atvdrv according to the driving characteristics, and newly sets a result of subtracting the correction value Atvdrv from the basic acceleration limit value Alimb determined in step S453 as the basic acceleration limit value Alimb (Alimb←Alimb−Atvdrv).

Next, in step S455, the limit value calculation portion 407 corrects and updates the basic acceleration limit value Alimb determined in step S454 and the basic deceleration limit value Dlimb determined in step S453 according to the vehicle mass of the lead vehicle 1.

More specifically, assuming that Mtvv represents a reference vehicle mass of the lead vehicle 1 when the lead vehicle 1 carries no load, and Mtvvest represents an estimated value of the actual vehicle mass of the lead vehicle 1, in step S455, the limit value calculation portion 407 newly sets Mtvv×Alimb/Mtvvest as the basic acceleration limit value Alimb and newly sets Mtvv×Dlimb/Mtvvest as the basic deceleration limit value Dlimb.

Next, in step S456, the limit value calculation portion 407 compares the basic acceleration limit value Alimb and the basic deceleration limit value Dlimb determined in step S455 with an acceleration Atvfr according to the frictional force of the road surface on which the lead vehicle 1 runs, and sets ones of them having smaller values as the new basic acceleration limit value Alimb and the new basic deceleration limit value Dlimb (Alimb=min(Alimb, Atvfr) and Dlimb=min(Dlimb, Atvfr)).

Further, in the next step, step S457, the limit value calculation portion 407 calculates a correction value Ctvc according to an equation (8) based on an inclination Gtvr of the road surface on which the lead vehicle 1 runs.

$$Ctvc = g \times \sin(|Gtvr|) \tag{8}$$

Then, if the inclination of the road surface is in the upward direction with respect to the traveling direction of the lead vehicle 1, the limit value calculation portion 407 sets a result of subtracting the correction value Ctvc determined according to the equation (8) from the basic acceleration limit value Alimb determined in step S456 as the new basic acceleration limit value Alimb (Alimb=Alimb−Ctvc), and further sets a result of adding the correction value Ctvc determined according to the equation (8) to the basic deceleration limit value Dlimb determined in step S456 as the new basic deceleration limit value Dlimb (Dlimb=Dlimb+Ctvc).

Further, if the inclination of the road surface is in the downward direction with respect to the traveling direction of the lead vehicle 1, the limit value calculation portion 407 sets a result of adding the correction value Ctvc determined according to the equation (8) to the basic acceleration limit value Alimb determined in step S456 as the new basic acceleration limit value Alimb (Alimb=Alimb+Ctvc), and further sets a result of subtracting the correction value Ctvc determined according to the equation (8) from the basic deceleration limit value Dlimb determined in step S456 as the new basic deceleration limit value Dlimb (Dlimb=Dlimb−Ctvc).

Next, in step S458, the limit value calculation portion 407 outputs the basic acceleration limit value Alimb and the basic deceleration limit value Dlimb determined in the correction processing in step S457 to the select-low portion 409 as the basic acceleration limit value determined based on the specifications regarding the running of the lead vehicle 1.

In this manner, the limit value calculation portion 407 determines the basic acceleration limit value Alimb and the basic deceleration limit value Dlimb based on the maximum acceleration Atvmax and the maximum deceleration Dtvmax, the air resistance, the driving characteristics of the driving apparatus 410, the vehicle mass, the road surface friction, and the road surface inclination, which are the specifications regarding the running of the lead vehicle 1, and outputs a signal regarding the determined basic acceleration limit value Alimb and basic deceleration limit value Dlimb to the select-low portion 409.

The communication reception apparatus 408 is a reception apparatus in communication between the lead vehicle 1 and the first following vehicle 3 for receiving the signal regarding the first acceleration limit value (the acceleration limit value Alim and the deceleration limit value Dlim) determined by the first following vehicle 3.

The communication reception apparatus 408 receives the signal regarding the acceleration limit value Alim and the deceleration limit value Dlim, and outputs it to the select-low portion 409.

The actual communication partner of the communication reception apparatus 408 is not limited to the first following vehicle 3, as long as the vehicle following running system is configured in such a manner that the signal regarding the first acceleration limit value determined by the first following vehicle 3 is eventually transmitted to the lead vehicle 1, similarly to the second communication transmission apparatus 210 of the first following vehicle 3.

The select-low portion 409 compares the basic acceleration limit value Alimb and the basic deceleration limit value Dlimb determined by the limit value calculation portion 407 with the acceleration limit value Alim and the deceleration limit value Dlim determined by the first following vehicle 3.

Then, the select-low portion 409 sets smaller one of the basic acceleration limit value Alimb and the acceleration limit value Alim as the set acceleration limit value Alimc (Alimc=min(Alimb, Alim)) and sets smaller one of the basic deceleration limit value Dlimb and the deceleration limit value Dlim as the set deceleration limit value Dlimc (Dlimc=min(Dlimb, Dlim)), and outputs a signal regarding the set acceleration limit value Alimc and the set deceleration limit value Dlimc.

The driving apparatus 410 acquires the signal regarding the set acceleration limit value Alimc from the select-low portion 409, and imposes a limit on the driving force to be output in such a manner that the acceleration of the lead vehicle 1 does not exceed the set acceleration limit value Alimc.

In other words, if the acceleration of the lead vehicle 1 that is acquired according to an acceleration operation amount of the driver of the lead vehicle 1 (for example, an amount of operating the accelerator pedal) is expected to exceed the set acceleration limit value Alimc, the driving apparatus 410 limits the driving force to be output by the driving actuator in such a manner that the acceleration of the lead vehicle 1 does not exceed the set acceleration limit value Alimc regardless of the acceleration operation amount of the driver.

For example, even when the driver presses the accelerator pedal by a predetermined amount or more, the driving apparatus 410 does not reflect the acceleration operation amount of the driver in the actual motor torque or engine torque and prohibits an acceleration exceeding the set acceleration limit value Alimc from being achieved.

Alternatively, the driving apparatus 410 can mechanically limit the acceleration operation amount in such a manner that the acceleration operation amount input by the driver does not exceed an operation amount equivalent to the set acceleration limit value Alimc. For example, when the driver attempts to press the accelerator pedal by a predetermined amount or more, the driving apparatus 410 provides an operation that impedes the pressing of the accelerator pedal with use of a dedicated actuator or the like, thereby prohibiting the driver from pressing the accelerator pedal by the predetermined amount or more.

In a case where the lead vehicle 1 is accelerated according to an acceleration instruction output from an advanced driver assistance system, an autonomous driving system, or the like, the vehicle following running system can be configured in such a manner that the acceleration instruction issued from the advanced driver assistance system or the like to the driving apparatus 410 is limited according to the set acceleration limit value Alimc output from the select-low portion 409 and the acceleration instruction after the limiting processing is fed to the driving apparatus 410, instead of the driving apparatus 410 limiting the acceleration.

The braking apparatus 411 acquires the signal regarding the set deceleration limit value Dlimc from the select-low portion 409, and imposes a limit on the braking force to be output in such a manner that the deceleration of the lead vehicle 1 does not exceed the set deceleration limit value Dlimc.

At this time, the braking apparatus 411 can mechanically limit a deceleration operation amount in such a manner that the deceleration operation amount input by the driver (for example, an amount of operating the brake pedal) does not exceed an operation amount equivalent to the set deceleration limit value Dlimc.

For example, when the driver attempts to press the brake pedal by a predetermined amount or more, the braking apparatus 411, for example, impedes the pressing more than that by an operation of closing the valve of the master cylinder or provides an operation that impedes the pressing of the brake pedal with use of a dedicated actuator or the like, thereby prohibiting the driver from pressing the brake pedal by the predetermined amount or more.

In other words, if the deceleration of the lead vehicle 1 that is acquired according to the deceleration operation amount input by the driver of the lead vehicle 1 is expected to exceed the set deceleration limit value Dlimc, the braking apparatus 411 limits the braking force to be output by the braking actuator in such a manner that the deceleration of the lead vehicle 1 does not exceed the set deceleration limit value Dlimc regardless of the deceleration operation amount input by the driver.

For example, in a case of a brake-by-wire system, the brake pedal and the braking actuator are independent of each other. Therefore, even when the brake pedal is pressed by a predetermined amount or more, the braking apparatus 411 prohibits this deceleration operation amount from being reflected in the operation amount of the cylinder of each of the wheels, thereby being able to prevent a deceleration exceeding the set deceleration limit value Dlimc from being achieved.

In a case where the lead vehicle 1 is decelerated according to a deceleration instruction output from the advanced driver assistance system, the autonomous driving system, or the like, the vehicle following running system can be configured in such a manner that the deceleration instruction issued from the advanced driver assistance system or the like to the braking apparatus 411 is limited according to the set deceleration limit value Dlimc output from the select-low portion 409 and the deceleration instruction after the limiting processing is fed to the braking apparatus 411, instead of the braking apparatus 411 limiting the deceleration.

In the above-described manner, when being configured to limit the acceleration and the deceleration of the lead vehicle 1 based on the set acceleration limit value Alimc and the set deceleration limit value Dlimc, the vehicle following running system can improve the accuracy of maintaining the connection between the lead vehicle 1 and the first following vehicle 3 in the platoon without limiting the acceleration and the deceleration of the lead vehicle 1 more than necessary.

For example, generally, each of the vehicles forming the platoon does not necessarily have an equivalent motion performance, and, further, only a part of the vehicles in the platoon may be running on a slope or carrying a great load amount. In this manner, an internal or external factor impeding the acceleration or deceleration is not necessarily equally imposed on each of the vehicles forming the platoon.

However, when being configured to limit the acceleration and the deceleration of the lead vehicle 1 based on the set acceleration limit value Alimc and the set deceleration limit value Dlimc, like the above-described embodiment, the vehicle following running system can apply a limit in such a manner that the lead vehicle 1 is not operated at an excessively high acceleration or deceleration according to the factor impeding the acceleration or the deceleration that is imposed on the first following vehicle 3, thereby improving the accuracy of maintaining the connection between the lead vehicle 1 and the first following vehicle 3 in the platoon.

Further, for example, if the inter-vehicle distance between vehicles in the platoon deviates from the target value or a difference is generated in the vehicle speed from a vehicle running ahead due to a factor such as the performance of the inter-vehicle control or an unexpected disturbance, this vehicle is required to return the inter-vehicle distance to the target value or reduce the vehicle speed difference by more strongly accelerating or decelerating this vehicle than the immediately preceding vehicle.

At this time, limiting the acceleration and the deceleration of the lead vehicle 1 based on the set acceleration limit value Alimc and the set deceleration limit value Dlimc allows the acceleration or the deceleration of the lead vehicle 1 to be limited in such a manner that the first following vehicle 3 attains leeway sufficient to adjust the inter-vehicle distance and the relative vehicle speed, thereby improving the accuracy of maintaining the connection between the lead vehicle 1 and the first following vehicle 3.

Further, for example, in a case where the vehicle following running system is configured in such a manner that the vehicle changes its own set vehicle speed according to whether this vehicle is running at the head of the platoon instead of being configured according to the control of the above-described embodiment, the factor impeding the acceleration or the deceleration of the following vehicle is not reflected in the set vehicle speed of the lead vehicle.

This raises the necessity of allowing leeway sufficient to ensure the accuracy of maintaining the connection when setting the vehicle speed of the lead vehicle assuming a condition that the following vehicle may be subjected to the maximum factor impeding the acceleration or the deceleration of the following vehicle, thereby bringing about such a situation that the acceleration or the deceleration of the lead vehicle is limited more than necessary.

On the other hand, according to the above-described embodiment, the set acceleration limit value Alimc for limiting the acceleration of the lead vehicle 1 and the set deceleration limit value Dlimc for limiting the deceleration of the lead vehicle 1 are values in which the performance, the environment, and the state of the first following vehicle 3 are reflected, and are the maximum acceleration and deceleration values that allow the platoon to be maintained. Therefore, the vehicle following running system can prevent the acceleration or the deceleration of the lead vehicle 1 from being limited more than necessary.

Second Embodiment

When the respective performances, environments, and states of the plurality of following vehicles 2 are reflected in the limits on the acceleration and the deceleration of the lead vehicle 1, the vehicle following running system can employ such a method that each of the following vehicles 2 except for the last vehicle has a select-low function of receiving the signal regarding the acceleration limit value Alim and the deceleration limit value Dlim from the immediately subsequent vehicle and transmitting smaller ones of the received acceleration limit value Alim and deceleration limit value Dlim and the acceleration limit value Alim and the deceleration limit value Dlim determined by this vehicle itself to the immediately preceding vehicle, and the lead vehicle 1 acquires the acceleration limit value Alim and the deceleration limit value Dlim acquired by the select-low function of the immediately subsequent vehicle, thereby acquiring the smallest values among the acceleration limit values Alim and the deceleration limit values Dlim respectively determined by the individual following vehicles 2 as a result thereof.

In the present disclosure, this method will be referred to as a sequential select-low method, and will be described below.

Figure 6:
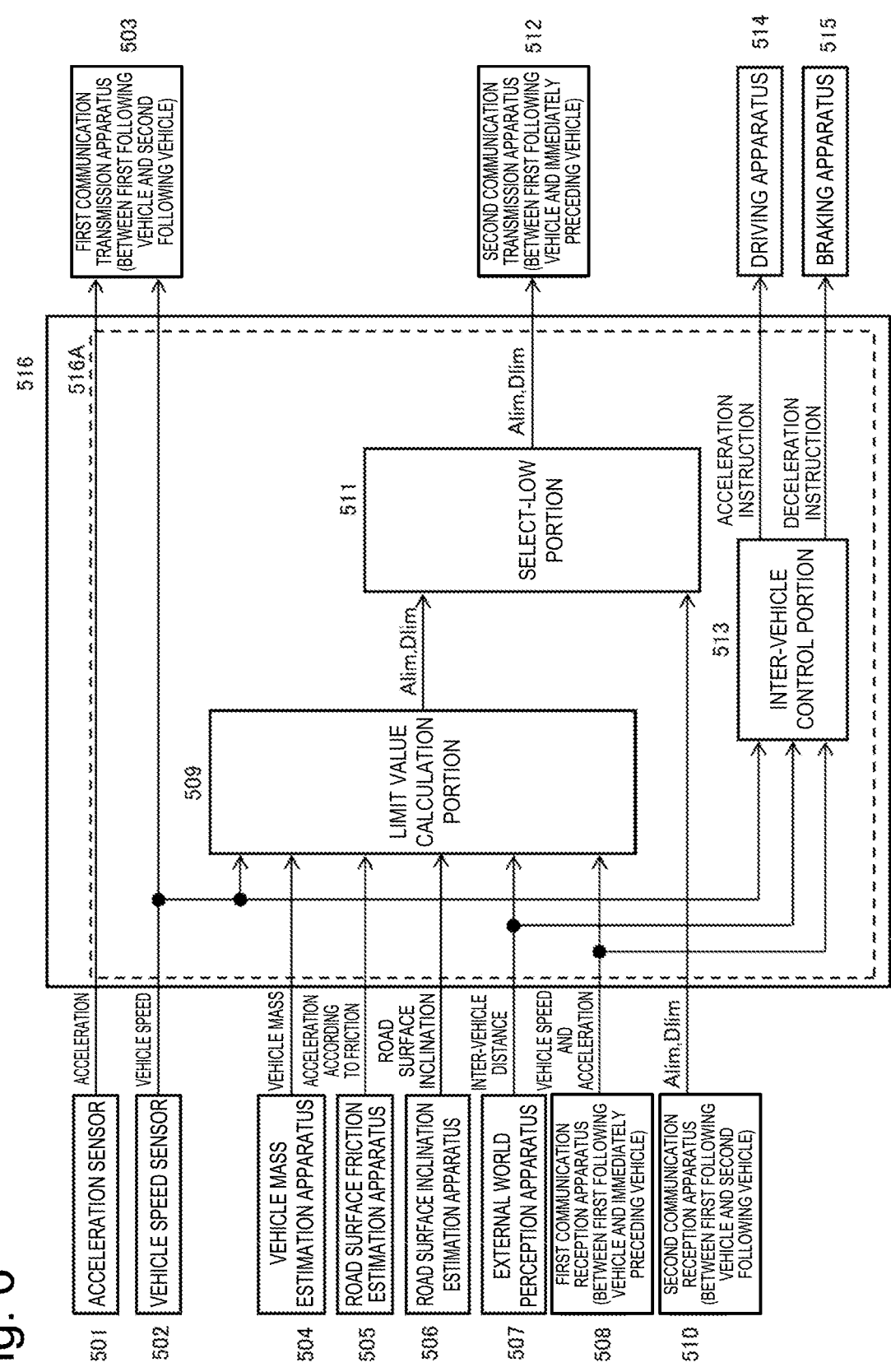
FIG. 6 is a block diagram illustrating a vehicle control system mounted on the following vehicle according to a second embodiment.

FIG. 6 is a block diagram illustrating one configuration of a vehicle control system mounted on the following vehicle 2 in the vehicle following running system employing the sequential select-low method.

In the following description, a vehicle targeted for the description among the following vehicles 2 will be referred to as a first following vehicle, and an immediately subsequent vehicle behind the first following vehicle will be referred to as a second following vehicle.

The vehicle control system of the first following vehicle includes an acceleration sensor 501, a vehicle speed sensor 502, a vehicle mass estimation apparatus 504, a road surface friction estimation apparatus 505, a road surface inclination estimation apparatus 506, and an external world perception apparatus 507 for identifying the acceleration, the vehicle speed, the vehicle mass, the road surface friction, and the road surface inclination of the first following vehicle.

The above-described acceleration sensor 501, vehicle speed sensor 502, vehicle mass estimation apparatus 504, road surface friction estimation apparatus 505, road surface inclination estimation apparatus 506, and external world perception apparatus 507 are apparatuses having similar functions to the acceleration sensor 201, the vehicle speed sensor 202, the vehicle mass estimation apparatus 204, the road surface friction estimation apparatus 205, the road surface inclination estimation apparatus 206, and the external world perception apparatus 207 illustrated in FIG. 2, and therefore the detailed descriptions thereof will be omitted herein.

Further, the vehicle control system of the first following vehicle includes a first communication reception apparatus 508 and a second communication reception apparatus 510 as the communication reception apparatus.

The first communication reception apparatus 508 is a reception apparatus in communication between the first following vehicle and the immediately preceding vehicle that allows the first following vehicle to acquire information regarding the running state of the immediately preceding vehicle, and receives a signal regarding the vehicle speed and the acceleration of the immediately preceding vehicle that is transmitted from the immediately preceding vehicle, similarly to the communication reception apparatus 208 illustrated in FIG. 2.

The second communication reception apparatus 510 is a reception apparatus in communication between the first following vehicle and the second following vehicle (the immediately subsequent vehicle), and receives a signal regarding the acceleration limit value Alim and the deceleration limit value Dlim from the second following vehicle as a second acceleration limit value.

The actual communication partner of the second communication reception apparatus 510 is not limited to the second following vehicle, as long as the acceleration limit value Alim and the deceleration limit value Dlim acquired by the second communication reception apparatus 510 are values output from the second following vehicle.

A vehicle control apparatus 516 includes a control portion 516A that makes a calculation based on the various kinds of information acquired by the above-described apparatuses, and outputs a calculated result.

The control portion 516A includes a limit value calculation portion 509, a select-low portion 511, and an inter-vehicle control portion 513.

The limit value calculation portion 509 calculates the acceleration limit value Alim and the deceleration limit value Dlim as the first acceleration limit value based on the specifications regarding the running of the first following vehicle, and outputs a signal regarding the calculated acceleration limit value Alim and deceleration limit value Dlim to the select-low portion 511.

The limit value calculation portion 509 determines the acceleration limit value Alim based on the maximum acceleration Amax of the first following vehicle, further determines the deceleration limit value Dlim based on the maximum deceleration Dmax of the first following vehicle, and corrects the determined acceleration limit value Alim and deceleration limit value Dlim based on the running conditions such as the air resistance and the specifications regarding the running of the first following vehicle 3 such as the driving characteristics of the driving apparatus 514, thereby determining the final acceleration limit value Alim and deceleration limit value Dlim.

Processing for calculating the acceleration limit value Alim and the deceleration limit value Dlim by the limit value calculation portion 509 is performed according to the procedure illustrated in the flowchart of FIG. 3 similarly to the above-described limit value calculation portion 209, and therefore the detailed description thereof will be omitted herein.

The select-low portion 511 compares the acceleration limit value Alim and the deceleration limit value Dlim as the second acceleration limit value acquired from the second following vehicle with the acceleration limit value Alim and the deceleration limit value Dlim as the first acceleration limit value determined by the limit value calculation portion 509 of the first following vehicle.

Then, the select-low portion 511 outputs smaller one of the acceleration limit value Alim acquired from the second following vehicle and the acceleration limit value Alim determined by the limit value calculation portion 509 of the first following vehicle 3 as the final acceleration limit value Alim, and outputs smaller one of the deceleration limit value Dlim acquired from the second following vehicle and the deceleration limit value Dlim determined by the limit value calculation portion 509 of the first following vehicle 3 as the final deceleration limit value Dlim.

The inter-vehicle control portion 513 outputs an acceleration instruction to the driving apparatus 514 of the first following vehicle and outputs a deceleration instruction to a braking apparatus 515 of the first following vehicle to keep the inter-vehicle distance between the first following vehicle 3 and the immediately preceding vehicle at a target value.

Processing for outputting the acceleration instruction and the deceleration instruction for the inter-vehicle control by the inter-vehicle control portion 513 is performed in a similar manner to the inter-vehicle control portion 211 illustrated in FIG. 2, and therefore the detailed description thereof will be omitted herein.

Further, the vehicle control system of the first following vehicle includes a first communication transmission apparatus 503 and a second communication transmission apparatus 512 as the communication transmission apparatus.

The first communication transmission apparatus 503 is a transmission apparatus used in communication between the first following vehicle and the second following vehicle, which corresponds to the immediately subsequent vehicle, and transmits information regarding the vehicle speed and the acceleration of the first following vehicle to the second following vehicle as the information regarding the running state of the first following vehicle, similarly to the first communication transmission apparatus 203 illustrated in FIG. 2.

The second following vehicle performs the inter-vehicle control based on the vehicle speed and the acceleration of the first following vehicle.

The second communication transmission apparatus 512 transmits a signal regarding the limit values Alim and Dlim output from the select-low portion 511 to the immediately preceding vehicle.

If the immediately preceding vehicle ahead of the first following vehicle is not the lead vehicle 1 but is the following vehicle 2, this vehicle itself is treated as the second following vehicle in the immediately preceding vehicle, and therefore the signal regarding the limit values Alim and Dlim transmitted from its own second communication transmission apparatus 512 to the immediately preceding vehicle is handled as the second acceleration limit value output from the second following vehicle in the immediately preceding vehicle.

Then, the select-low portion 511 of the immediately preceding vehicle ahead of the first following vehicle compares the limit values Alim and Dlim determined by the limit value calculation portion 509 of the immediately preceding vehicle (the first acceleration limit value) with the limit values Alim and Dlim after the select-low processing that is output from the first following vehicle (the second acceleration limit value).

On the other hand, if the immediately preceding vehicle ahead of the first following vehicle is the lead vehicle 1, the lead vehicle 1 sets smaller one of the acceleration limit value Alim acquired from the first following vehicle and the basic acceleration limit value Alimb determined by the lead vehicle 1 as the set acceleration limit value Alimc, and sets smaller one of the deceleration limit value Dlim acquired from the first following vehicle and the basic deceleration limit value Dlimb determined by the lead vehicle 1 as the set deceleration limit value Dlimc, as will be described in detail.

Then, the acceleration is limited based on the set acceleration limit value Alimc and the deceleration is limited based on the set deceleration limit value Dlimc in the lead vehicle 1.

Figure 7:
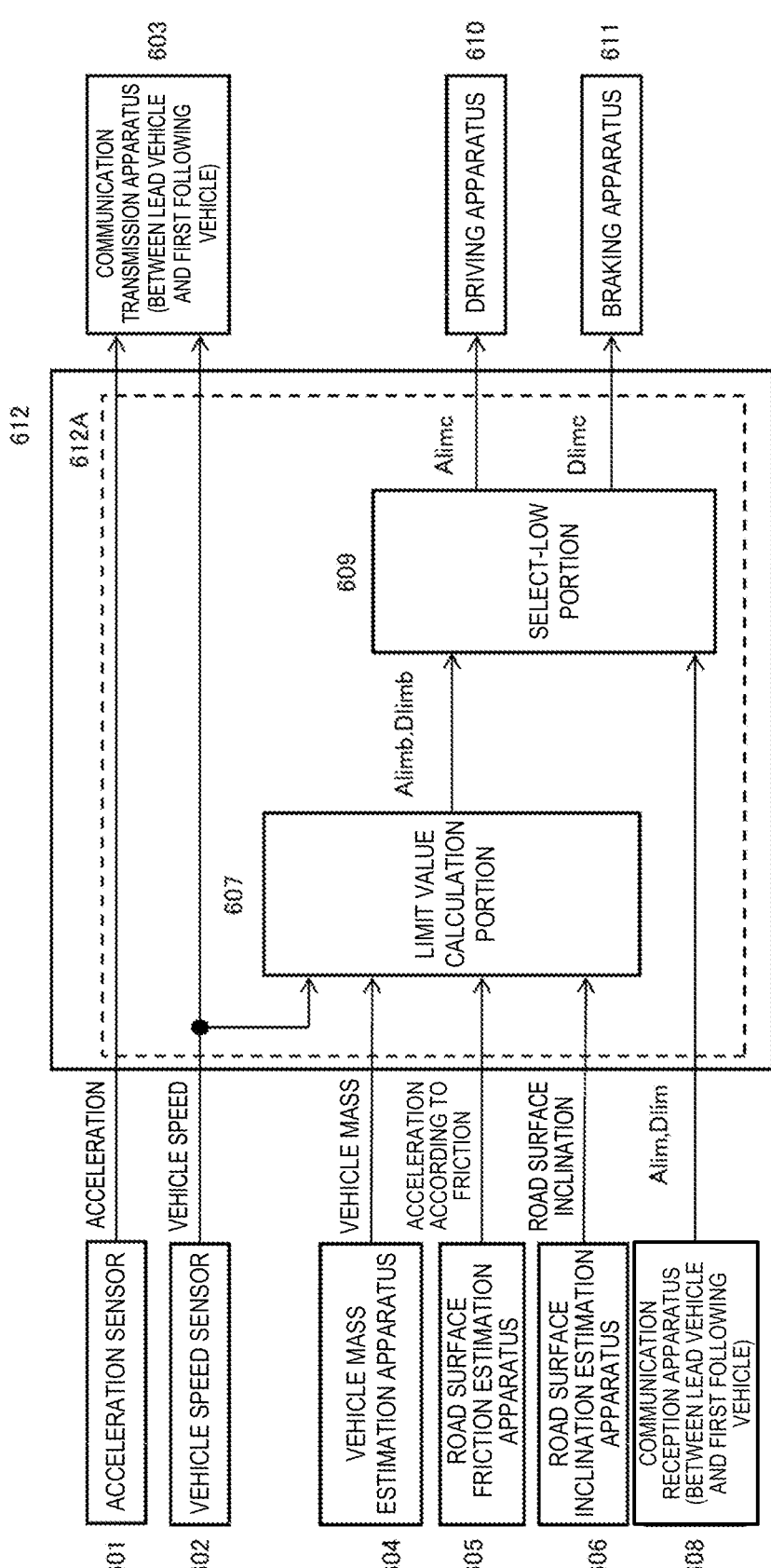
FIG. 7 is a block diagram illustrating a vehicle control system mounted on the lead vehicle according to the second embodiment.

FIG. 7 is a block diagram illustrating one configuration of a vehicle control system mounted on the lead vehicle 1 in the vehicle following running system employing the sequential select-low method.

In FIG. 7, assume that the immediately subsequent vehicle ahead of the lead vehicle 1 is the first following vehicle.

The vehicle control system of the lead vehicle 1 includes an acceleration sensor 601, a vehicle speed sensor 602, a vehicle mass estimation apparatus 604, a road surface friction estimation apparatus 605, and a road surface inclination estimation apparatus 606.

They are apparatuses having similar functions to the acceleration sensor 401, the vehicle speed sensor 402, the vehicle mass estimation apparatus 404, the road surface friction estimation apparatus 405, and the road surface inclination estimation apparatus 406 illustrated in FIG. 4, and therefore the detailed descriptions thereof will be omitted herein.

Further, the vehicle control system of the lead vehicle 1 includes a communication reception apparatus 608.

In this case, the communication reception apparatus 608 receives the acceleration limit value Alim and the deceleration limit value Dlim output from the first following vehicle, and is similar to the communication reception apparatus 408 illustrated in FIG. 4 in terms hereof.

However, in the sequential select-low method, each of the following vehicles 2 outputs the smallest values of the acceleration limit values Alim and the deceleration limit values Dlim respectively determined by all of this vehicle and the vehicles subsequent thereto, and this means that the communication reception apparatus 608 receives the smallest values of the acceleration limit values Alim and the deceleration limit values Dlim respectively determined by all of the following vehicles 2.

A vehicle control apparatus 612 includes a control portion 612A that makes a calculation based on the various kinds of information acquired by the above-described apparatuses and outputs a calculated result, and the control portion 612A includes a limit value calculation portion 607 and a select-low portion 609, similarly to the vehicle control apparatus 412 illustrated in FIG. 4.

The limit value calculation portion 607 calculates the basic acceleration limit value (the basic acceleration limit value Alimb and the basic deceleration limit value Dlimb) according to the procedure illustrated in the flowchart of FIG. 5, similarly to the limit value calculation portion 407 illustrated in FIG. 4.

The select-low portion 609 compares the basic acceleration limit value Alimb and the basic deceleration limit value Dlimb calculated by the limit value calculation portion 607 with the acceleration limit value Alim and the deceleration limit value Dlim transmitted from the first following vehicle (the immediately subsequent vehicle).

In this case, the acceleration limit value Alim that the select-low portion 609 acquires from the first following vehicle via the communication reception apparatus 608 is the smallest value of the acceleration limit values Alim that the following vehicles 2 including the first following vehicle calculate based on the specifications regarding their own running, respectively.

Similarly, the deceleration limit value Dlim that the select-low portion 609 acquires from the first following vehicle via the communication reception apparatus 608 is the smallest value of the deceleration limit values Dlim that the following vehicles 2 including the first following vehicle calculate based on the specifications regarding their own running, respectively.

Then, the select-low portion 609 outputs smaller one of the basic acceleration limit value Alimb calculated by the limit value calculation portion 607 and the acceleration limit value Alim acquired from the first following vehicle 3 as the set acceleration limit value Alimc, and further outputs smaller one of the basic deceleration limit value Dlimb calculated by the limit value calculation portion 607 and the deceleration limit value Dlim acquired from the first following vehicle 3 as the set deceleration limit value Dlimc.

A communication transmission apparatus 603 is a transmission apparatus used in communication between the lead vehicle 1 and the first following vehicle, which corresponds to the immediately subsequent vehicle behind the lead vehicle 1, and transmits information regarding the vehicle speed and the acceleration of the lead vehicle 1 to the first following vehicle 3 as information used in the inter-vehicle control in the first following vehicle 3.

A driving apparatus 610 acquires the signal regarding the set acceleration limit value Alimc from the select-low portion 609, and imposes a limit on the driving force to be output in such a manner that the acceleration of the lead vehicle 1 does not exceed the set acceleration limit value Alimc, similarly to the driving apparatus 410 illustrated in FIG. 4.

Further, a braking apparatus 611 acquires the signal regarding the set deceleration limit value Dlimc from the select-low portion 609, and imposes a limit on the braking force to be output in such a manner that the deceleration of the lead vehicle 1 does not exceed the set deceleration limit value Dlimc, similarly to the braking apparatus 411 illustrated in FIG. 4.

Figure 8:
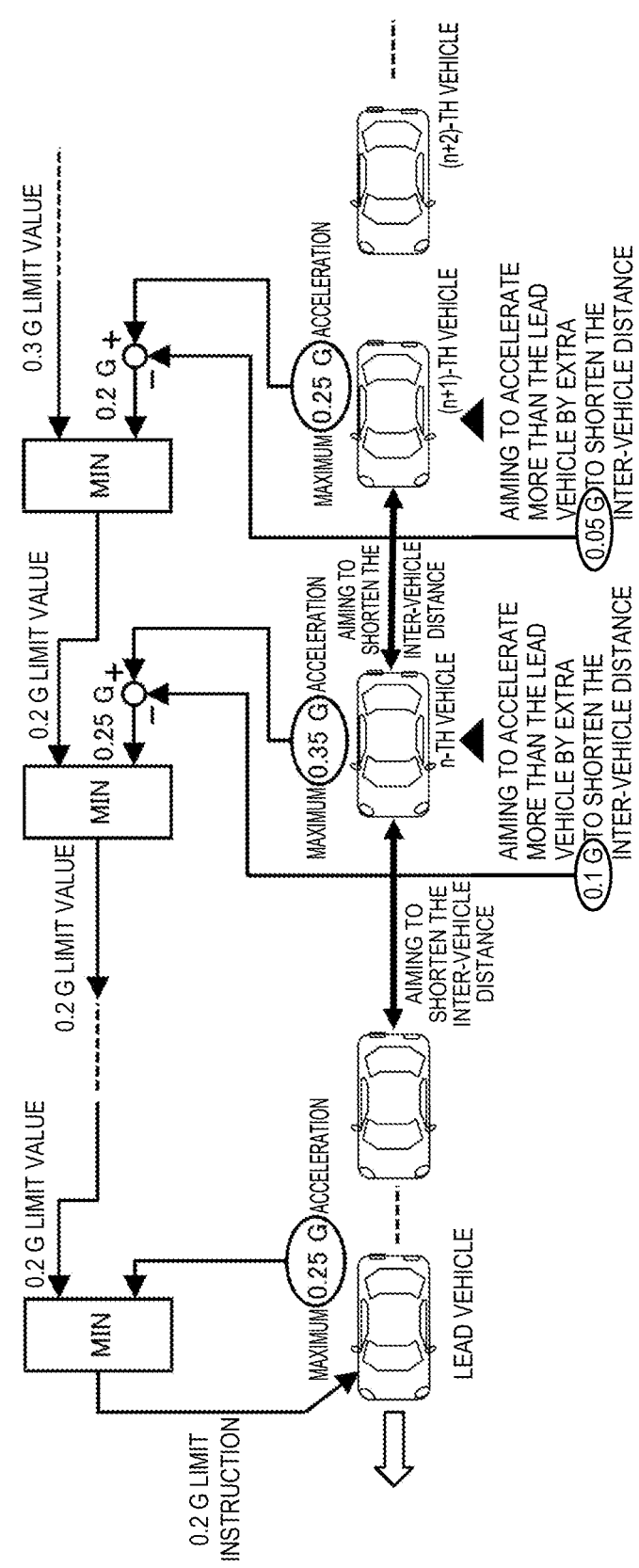
FIG. 8 schematically illustrates a procedure of limiting the acceleration according to a sequential select-low method according to the second embodiment.

FIG. 8 schematically illustrates a procedure of limiting the acceleration in the entire platoon according to the sequential select-low method.

FIG. 8 illustrates an example limited to the calculation of the set acceleration limit value Alimc for simplification of the description, and, further, indicating that each of the following vehicles 2 calculates its own maximum acceleration Amax and the acceleration limit value Alim according to the inter-vehicle distance between this vehicle and the immediately preceding vehicle.

In FIG. 8, the (n+2)-th following vehicle among the following vehicles 2 outputs a signal specifying 0.3 G as the acceleration limit value Alim to the (n+1)-th following vehicle, which corresponds to the immediately preceding vehicle, based on a correction request according to its own maximum acceleration Amax and the inter-vehicle distance between this (n+2)-th following vehicle and the immediately preceding vehicle.

The maximum acceleration Amax of the (n+1)-th following vehicle is 0.25 G, but the (n+1)-th following vehicle requests limitation on the acceleration of the lead vehicle 1 with extra 0.05 G added thereto to shorten the inter-vehicle distance between this (n+1)-th following vehicle and the immediately preceding vehicle.

Therefore, the (n+1)-th following vehicle performs the select-low processing on 0.2 G resulting from subtracting 0.05 G, which is the request to shorten the inter-vehicle distance, from 0.25 G, which is the maximum acceleration Amax, and 0.3 G, which is the acceleration limit value Alim acquired from the (n+2)-th following vehicle, and outputs a signal specifying 0.2 G as the acceleration limit value Alim to the n-th following vehicle, which corresponds to the immediately preceding vehicle.

The maximum acceleration Amax of the n-th following vehicle is 0.35 G, but the n-th following vehicle requests limitation on the acceleration of the lead vehicle 1 with extra 0.1 G added thereto to shorten the inter-vehicle distance between this n-th following vehicle and the immediately preceding vehicle.

Therefore, the n-th following vehicle performs the select-low processing on 0.25 G resulting from subtracting 0.1 G, which is the request to shorten the inter-vehicle distance, from 0.35 G, which is the maximum acceleration Amax, and 0.2 G, which is the acceleration limit value Alim acquired from the (n+1)-th following vehicle, and outputs a signal specifying 0.2 G as the acceleration limit value Alim to the immediately preceding vehicle.

Then, the maximum acceleration Amax of the lead vehicle 1 is 0.25 G, and, when receiving the signal specifying 0.2 G as the acceleration limit value Alim from the immediately subsequent vehicle, the lead vehicle 1 sets the set acceleration limit value Alimc to 0.2 G due to the select-low processing on them and limits the acceleration of the lead vehicle 1 to equal to or lower than 0.2 G, which is the upper limit value.

This can prevent the lead vehicle 1 from being accelerated at an acceleration higher than the set acceleration limit value Alimc, which is the maximum acceleration necessary for each of the vehicles to maintain the platoon, and, further, allows each of the following vehicles 2 to shorten the inter-vehicle distance while following the lead vehicle 1 without exceeding its own maximum acceleration Amax.

As illustrated in FIG. 8, in the sequential select-low method when the platoon is assembled by three or more vehicles, the set acceleration limit value of the lead vehicle 1 is set to the smallest value among the first acceleration limit value determined based on the specifications regarding the running of the first following vehicle including the information regarding the first maximum acceleration, which is the performance of the first following vehicle, the second acceleration limit value determined based on the specifications regarding the running of the second following vehicle including the information regarding the second maximum acceleration, which is the performance of the second following vehicle subsequent to the first following vehicle, and the basic acceleration limit value determined based on the specifications regarding the running of the lead vehicle 1 including the information regarding the maximum acceleration (the basic maximum acceleration), which is the performance of the lead vehicle 1.

Further, in the sequential select-low method, when each of the following vehicles 2 sets the acceleration limit value Alim and the deceleration limit value Dlim according to the flowchart of FIG. 3, the specifications regarding the running of the first following vehicle include the first acceleration determined based on the first relative distance, which is the relative distance of the first following vehicle to the preceding vehicle immediately ahead thereof, and the first relative speed, which is the relative vehicle speed of the first following vehicle to the preceding vehicle immediately ahead thereof, and the specifications regarding the running of the second following vehicle subsequent to the first following vehicle include the second acceleration determined based on the second relative distance, which is the relative distance of the second following vehicle to the preceding vehicle immediately ahead thereof, and the second relative speed, which is the relative vehicle speed of the second following vehicle to the preceding vehicle immediately ahead thereof due to the processing in steps S307 and S308.

Then, the select-low portion 609 of the lead vehicle 1 acquires a following vehicle limit value, which is a smaller value of the first acceleration limit value determined based on the specifications regarding the running of the first following vehicle and the second acceleration limit value determined based on the specifications regarding the running of the second following vehicle subsequent to the first following vehicle, and sets smaller one of this following vehicle limit value and the basic acceleration limit value as the set acceleration limit value.

According to the vehicle following running system illustrated in FIGS. 6 to 8, the accuracy of maintaining the connection throughout the entire platoon can be improved without limiting the acceleration and the deceleration of the lead vehicle 1 more than necessary.

Now, the acceleration and the deceleration of the lead vehicle 1 should be limited with use of information about all of the vehicles forming the platoon instead of focusing only on one of the lead vehicle 1 and the following vehicles 2 to maintain the followability throughout the entire platoon.

For this reason, the above-described vehicle following running system illustrated in FIGS. 6 to 8 causes all of the vehicles forming the platoon to each calculate the acceleration limit value and uses the smallest value among them as the acceleration limit value of the lead vehicle 1, thereby maintaining the followability throughout the entire platoon.

Further, the vehicle following running system determines the smallest value among the acceleration limit values respectively calculated by all of the vehicles according to the sequential select-low method that selects smaller one of the value minimum so far and the acceleration limit value determined by this vehicle and passes on it to the immediately preceding vehicle, and therefore the communication partner of each of the vehicles can be limited to the immediately preceding vehicle and the immediately subsequent vehicle, and, further, each of the following vehicles 2 does not have to be conscious of what number position this vehicle is running at in the platoon and can be configured identically to one another.

Further, in the sequential select-low method, the lead vehicle 1 acquires the smallest value among the acceleration limit values respectively calculated by the plurality of following vehicles 2 and therefore can limit the braking/driving force according to the information about all of the vehicles forming the platoon without knowing the number of following vehicles 2, and the vehicle following running system employing the sequential select-low method allows the number of following vehicles 2 to be freely changed.

Third Embodiment

When reflecting the respective performances, environments, and states of the plurality of following vehicles 2 in the limits on the acceleration and the deceleration of the lead vehicle 1, the vehicle following running system can employ such a method that each of the following vehicles 2 transmits the signal regarding the acceleration limit value Alim and the deceleration limit value Dlim determined by this vehicle itself to the lead vehicle 1, and the lead vehicle 1 performs the select-low processing on the acceleration limit value Alim and the deceleration limit value Dlim acquired from each of the following vehicles 2 and the basic acceleration limit value Alimb and the basic deceleration limit value Dlimb determined by this lead vehicle 1, thereby determining the set acceleration limit value Alimc and the set deceleration limit value Dlimc.

In the present disclosure, this method will be referred to as a collective select-low method, and will be described below.

In the following description of the collective select-low method, the number of following vehicles 2 constructing the platoon will be assumed to be N (N is an integer equal to or greater than 2), and, further, the N following vehicles 2 will be referred to as the first following vehicle, the second following vehicle, the third following vehicle, . . . , and the N-th following vehicle in the order from the immediately subsequent vehicle behind the lead vehicle 1 toward the last vehicle in the platoon.

Further, in the collective select-low method that will be described below, each of the following vehicles 2 calculates the acceleration limit value Alim and the deceleration limit value Dlim based on the specifications regarding its own running and transmits the signal regarding the calculated acceleration limit value Alim and deceleration limit value Dlim to the lead vehicle 1, but the vehicle following running system can be configured in such a manner that information necessary to calculate the acceleration limit value Alim and the deceleration limit value Dlim is transmitted from each of the following vehicles 2 to the lead vehicle 1 and the lead vehicle 1 determines the acceleration limit value Alim and the deceleration limit value Dlim requested from each of the following vehicles 2.

Figure 9:
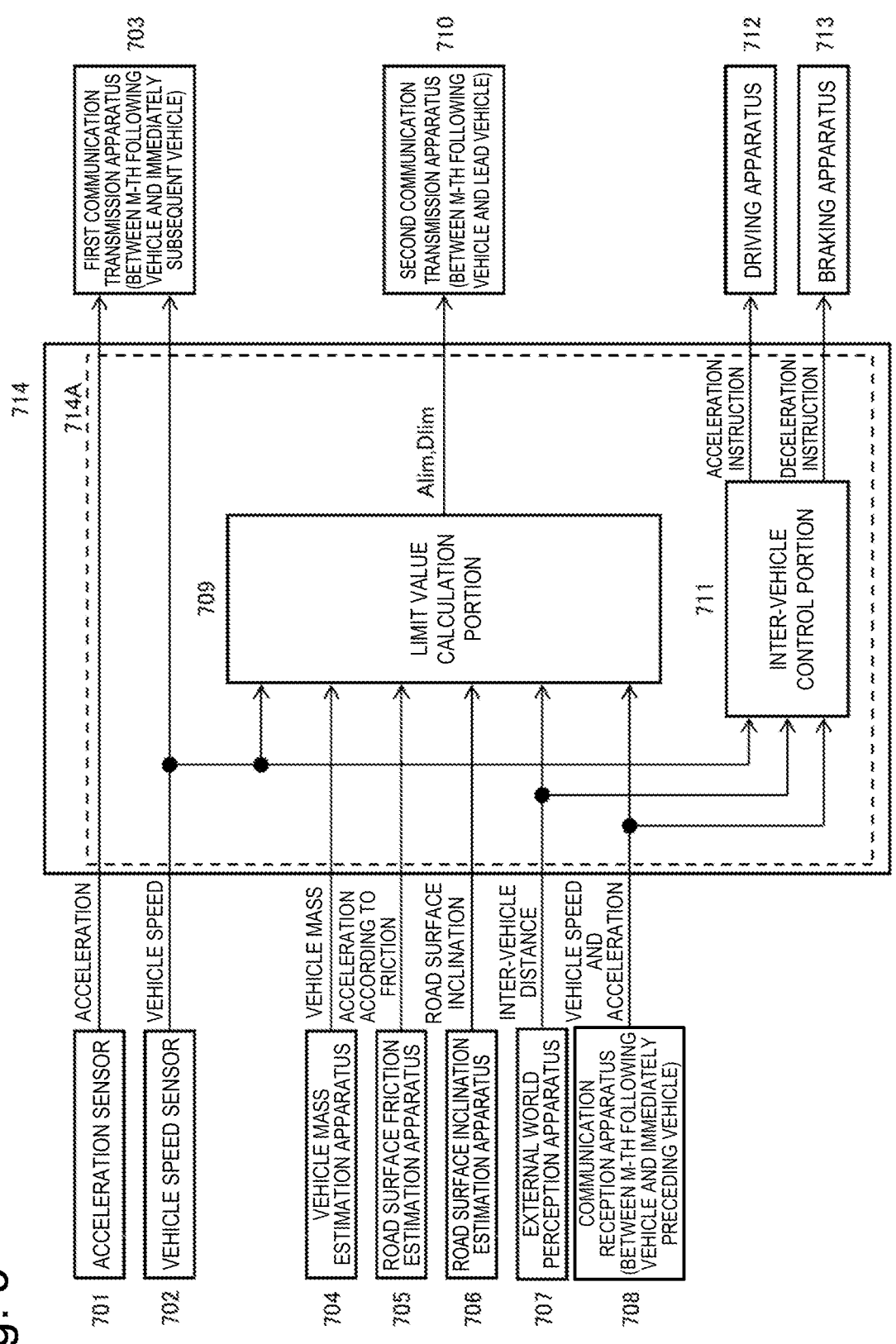
FIG. 9 is a block diagram illustrating a vehicle control system mounted on the following vehicle according to a third embodiment.

FIG. 9 is a block diagram illustrating one configuration of a vehicle control system mounted on each of the following vehicles 2 in the vehicle following running system employing the collective select-low method.

A targeted following vehicle will be referred to as an M-th following vehicle for the description.

The vehicle control system of the M-th following vehicle includes an acceleration sensor 701, a vehicle speed sensor 702, a vehicle mass estimation apparatus 704, a road surface friction estimation apparatus 705, a road surface inclination estimation apparatus 706, and an external world perception apparatus 707 for identifying the acceleration, the vehicle speed, the vehicle mass, the road surface friction, the road surface inclination, and the external world information of the M-th following vehicle, and, further, includes a communication reception apparatus 708, which is a reception apparatus in communication between the immediately preceding vehicle and the M-th following vehicle for acquiring the information regarding the vehicle speed and the acceleration of the immediately preceding vehicle.

The above-described acceleration sensor 701, vehicle speed sensor 702, vehicle mass estimation apparatus 704, road surface friction estimation apparatus 705, road surface inclination estimation apparatus 706, external world perception apparatus 707, and communication reception apparatus 708 are apparatuses having similar functions to the acceleration sensor 201, the vehicle speed sensor 202, the vehicle mass estimation apparatus 204, the road surface friction estimation apparatus 205, the road surface inclination estimation apparatus 206, the external world perception apparatus 207, and the communication reception apparatus 208 illustrated in FIG. 2, and therefore the detailed descriptions thereof will be omitted herein.

A vehicle control apparatus 714 includes a control portion 714A that makes a calculation based on the various kinds of information acquired by the above-described apparatuses, and outputs a calculated result.

The control portion 714A includes a limit value calculation portion 709 and an inter-vehicle control portion 711.

The limit value calculation portion 709 determines the acceleration limit value Alim and the deceleration limit value Dlim based on the specifications regarding the running of the M-th following vehicle.

Processing for calculating the acceleration limit value Alim and the deceleration limit value Dlim by the limit value calculation portion 709 is performed according to the procedure illustrated in the flowchart of FIG. 3 similarly to the limit value calculation portion 209 illustrated in FIG. 2, and therefore the detailed description thereof will be omitted herein.

The inter-vehicle control portion 711 outputs an acceleration instruction to a driving apparatus 712 of the M-th following vehicle and outputs a deceleration instruction to a braking apparatus 713 of the M-th following vehicle to keep the inter-vehicle distance between the M-th following vehicle and the immediately preceding vehicle at a target value.

Processing for outputting the acceleration instruction and the deceleration instruction for the inter-vehicle control by the inter-vehicle control portion 711 is performed in a similar manner to the above-described inter-vehicle control portion 211, and therefore the detailed description thereof will be omitted herein.

A first communication transmission apparatus 703 transmits a signal regarding the vehicle speed and the acceleration of the M-th following vehicle to the immediately subsequent vehicle for the inter-vehicle control in the immediately subsequent vehicle, similarly to the first communication transmission apparatus 203 illustrated in FIG. 2.

Further, a second communication transmission apparatus 710 is a transmission apparatus used in communication between the lead vehicle 1 and the M-th following vehicle, and transmits the signal regarding the acceleration limit value Alim and the deceleration limit value Dlim calculated by the limit value calculation portion 709 of the M-th following vehicle to the lead vehicle 1.

In other words, in the vehicle following running system employing the collective select-low method, the plurality of following vehicles 2 each calculates the acceleration limit value Alim and the deceleration limit value Dlim and each transmits the calculated acceleration limit value Alim and deceleration limit value Dlim to the lead vehicle 1.

The actual communication partner of the second communication transmission apparatus 710 is not limited to the M-th following vehicle, as long as the vehicle following running system is configured in such a manner that the signal regarding the acceleration limit value determined by the M-th following vehicle is eventually transmitted to the lead vehicle 1.

Figure 10:
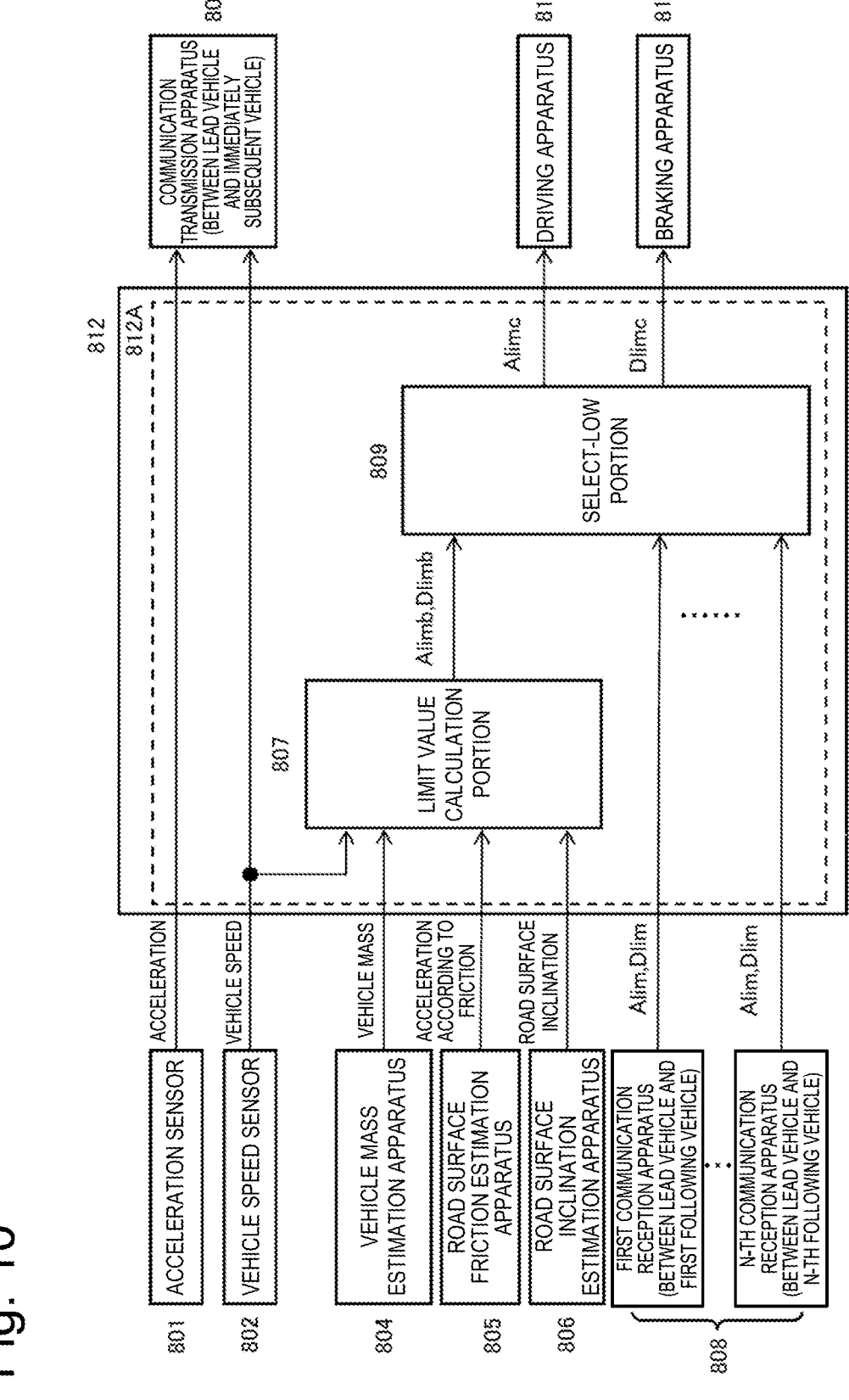
FIG. 10 is a block diagram illustrating a vehicle control system mounted on the lead vehicle according to the third embodiment.

FIG. 10 is a block diagram illustrating one configuration of a vehicle control system mounted on the lead vehicle 1 in the vehicle following running system employing the collective select-low method.

An acceleration sensor 801, a vehicle speed sensor 802, a vehicle mass estimation apparatus 804, a road surface friction estimation apparatus 805, and a road surface inclination estimation apparatus 806 included in the vehicle control system mounted on the lead vehicle 1 are apparatuses that identify the acceleration, the vehicle speed, the vehicle mass, the road surface friction, and the road surface inclination of the lead vehicle 1.

These apparatuses are apparatuses having similar functions to the acceleration sensor 401, the vehicle speed sensor 402, the vehicle mass estimation apparatus 404, the road surface friction estimation apparatus 405, and the road surface inclination estimation apparatus 406 illustrated in FIG. 4, and therefore the detailed descriptions thereof will be omitted herein.

A communication reception apparatus 808 is a reception apparatus used in communication between the lead vehicle 1 and the following vehicles 2, and includes N reception apparatuses from a reception apparatus for communicating with the first following vehicle to a reception apparatus for communicating with the N-th following vehicle (a first communication reception apparatus to an N-th communication reception apparatus) to communicate with the N following vehicles 2, respectively.

Then, the communication reception apparatus 808 acquires the signals regarding the acceleration limit values Alim and the deceleration limit values Dlim (a first acceleration limit value to an N-th acceleration limit value) respectively calculated by the following vehicles 2 from the N following vehicles 2, respectively.

As long as the signals regarding the acceleration limit values Alim and the deceleration limit values Dlim respectively determined by the N following vehicles 2 can be acquired, the actual communication partner of the communication reception apparatus 808 is not limited to each of the following vehicles 2 respectively corresponding to them.

Alternatively, the communication reception apparatus 808 can be formed by one communication apparatus capable of receiving signals from a plurality of communication partners (i.e., the N following vehicles 2).

A vehicle control apparatus 812 includes a control portion 812A that makes a calculation based on the various kinds of information acquired by the apparatuses such as the above-described vehicle speed sensor 802 and outputs a calculated result, and the control portion 812A includes a limit value calculation portion 807 and a select-low portion 809, similarly to the vehicle control apparatus 412 illustrated in FIG. 4.

The limit value calculation portion 807 calculates the basic acceleration limit value (the basic acceleration limit value Alimb and the basic deceleration limit value Dlimb) according to the procedure illustrated in the flowchart of FIG. 5, similarly to the limit value calculation portion 407 illustrated in FIG. 4.

The select-low portion 809 acquires the basic acceleration limit value Alimb and the basic deceleration limit value Dlimb calculated by the limit value calculation portion 807, and the acceleration limit values Alim and the deceleration limit values Dlim respectively transmitted from the N following vehicles 2.

Then, the select-low portion 809 outputs the smallest value among the basic acceleration limit value Alimb and the N acceleration limit values Alim as the set acceleration limit value Alimc, and further outputs the smallest value among the basic deceleration limit value Dlimb and the N deceleration limit values Dlim as the set deceleration limit value Dlimc.

In other words, the select-low portion 809 of the lead vehicle 1 acquires the N acceleration limit values including the first acceleration limit value calculated based on the specifications regarding the running of the first following vehicle that is transmitted from the first following vehicle and the second acceleration limit value calculated based on the specifications regarding the running of the second following vehicle that is transmitted from the second following vehicle, further acquires the basic acceleration limit value calculated by the limit value calculation portion 807 based on the specifications regarding the running of the lead vehicle 1, and sets the smallest value among them as the set acceleration limit value.

A communication transmission apparatus 803 is a transmission apparatus used in communication between the lead vehicle 1 and the first following vehicle, which corresponds to the immediately subsequent vehicle behind the lead vehicle 1, and transmits information regarding the vehicle speed and the acceleration of the lead vehicle 1 to the first following vehicle as information used in the inter-vehicle control in the first following vehicle.

A driving apparatus 810 acquires the signal regarding the set acceleration limit value Alimc from the select-low portion 809, and imposes a limit on the driving force to be output in such a manner that the acceleration of the lead vehicle 1 does not exceed the set acceleration limit value Alimc, similarly to the driving apparatus 410 illustrated in FIG. 4.

Further, a braking apparatus 811 acquires the signal regarding the set deceleration limit value Dlimc from the select-low portion 809, and imposes a limit on the braking force to be output in such a manner that the deceleration of the lead vehicle 1 does not exceed the set deceleration limit value Dlimc, similarly to the braking apparatus 411 illustrated in FIG. 4.

Figure 11:
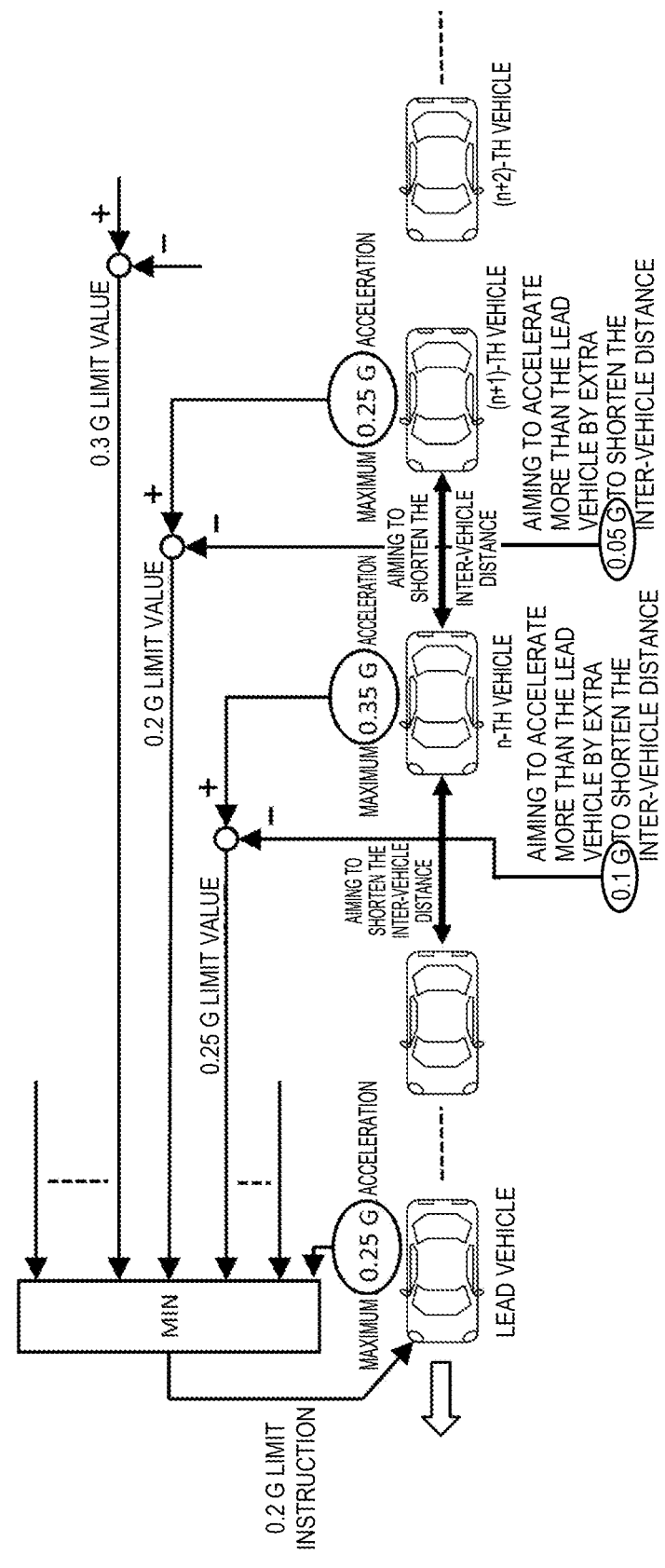
FIG. 11 schematically illustrates a procedure of limiting the acceleration by a collective select-low method according to the third embodiment.

FIG. 11 schematically illustrates a procedure of limiting the acceleration in the entire platoon according to the collective select-low method.

FIG. 11 illustrates an example limited to the calculation of the set acceleration limit value Alimc for simplification of the description, and, further, indicating that each of the following vehicles 2 calculates its own maximum acceleration Amax and the acceleration limit value Alim according to the inter-vehicle distance between this vehicle and the immediately preceding vehicle.

In FIG. 11, the (n+2)-th following vehicle among the following vehicles 2 outputs a signal specifying 0.3 G as the acceleration limit value Alim to the lead vehicle 1 based on its own maximum acceleration Amax and the inter-vehicle distance between this (n+2)-th following vehicle and the immediately preceding vehicle.

Further, the maximum acceleration Amax of the (n+1)-th following vehicle, which corresponds to the immediately preceding vehicle ahead of the (n+2)-th following vehicle, is 0.25 G, but the (n+1)-th following vehicle outputs a signal specifying 0.2 G (0.2=0.25−0.05) as the acceleration limit value Alim to the lead vehicle 1 to request the lead vehicle 1 to limit the acceleration thereof with extra 0.05 G added thereto with the aim of shortening the inter-vehicle distance between the (n+1)-th following vehicle and the immediately preceding vehicle.

Further, the maximum acceleration Amax of the n-th following vehicle, which corresponds to the immediately preceding vehicle ahead of the (n+1)-th following vehicle, is 0.35 G, but the n-th following vehicle outputs a signal specifying 0.25 G (0.25=0.35-0.1) as the acceleration limit value Alim to the lead vehicle 1 to request the lead vehicle 1 to limit the acceleration thereof with extra 0.1 G added thereto with the aim of shortening the inter-vehicle distance between the n-th following vehicle and the immediately preceding vehicle.

On the other hand, the maximum acceleration Amax of the lead vehicle 1 is 0.25 G, and the lead vehicle 1 sets the basic acceleration limit value Alimb to 0.25 G.

Then, the lead vehicle 1 performs the select-low processing on the acceleration limit values Alim respectively transmitted from the following vehicles 2 and the basic acceleration limit value Alimb set by the lead vehicle 1 itself to set the smallest value among them as the set acceleration limit value Alimc (Alimc=0.20 G in FIG. 11), and limits its own acceleration to equal to or lower than the set acceleration limit value Alimc, which is the upper limit value.

This can prevent the lead vehicle 1 from being accelerated at an acceleration higher than the set acceleration limit value Alimc, which is the maximum acceleration necessary for each of the vehicles to maintain the platoon, and, further, allows each of the following vehicles 2 to shorten the inter-vehicle distance while following the lead vehicle 1 without exceeding its own maximum acceleration Amax.

According to the above-escribed vehicle following running system illustrated in FIGS. 9 to 11, the accuracy of maintaining the connection throughout the entire platoon can be improved without limiting the acceleration and the deceleration of the lead vehicle 1 more than necessary.

Further, the above-described vehicle following running system illustrated in FIGS. 9 to 11 employs the collective select-low method that collects the information about the acceleration limit values Alim and the deceleration limit values Dlim respectively determined by the following vehicles 2 to the lead vehicle 1 and collectively performs the select-low processing in the lead vehicle 1, thereby being able to improve synchronism at the moment of the select-low processing with respect to each of the limit values respectively output from the vehicles forming the platoon.

In the case of the sequential select-low method, in which each of the vehicles forming the platoon includes the select-low portion, and the vehicle following running system repeatedly causes the result of the select-low processing to be passed on to, for example, the immediately preceding vehicle and causes it to perform the select-low processing, all of the following vehicles 2 sequentially performs the select-low processing and the information about the limit values is eventually transmitted to the lead vehicle 1, and therefore the repetition of the select-low processing causes a delay and the delay increases according to an increase in the number of following vehicles 2.

On the other hand, in the collective select-low method, the delay until the information regarding the acceleration limit values Alim and the deceleration limit values Dlim respectively determined by the following vehicles 2 is transmitted to the lead vehicle 1 is only a delay derived from the communication.

Therefore, the collective select-low method can improve the synchronism of the acceleration limit values Alim and the deceleration limit values Dlim used to calculate the set acceleration limit value Alimc and the set deceleration limit value Dlimc compared to the sequential select-low method that repeats the select-low processing, thereby being able to further improve the accuracy of maintaining the connection throughout the entire platoon.

Fourth Embodiment

Figure 12:
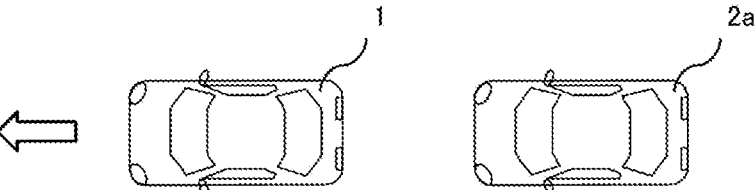
FIG. 12 illustrates a vehicle platoon including a lead vehicle and a single following vehicle.

FIG. 12 illustrates one configuration of platoon running in which two vehicles, namely, the freely running lead vehicle 1 and a first following vehicle 2a subsequent to the lead vehicle 1 carry out the following running by being non-mechanically connected.

In the following description, processing for limiting the acceleration and the deceleration of the lead vehicle 1 in the platoon running carried out by these two vehicles will be described.

Figure 13:
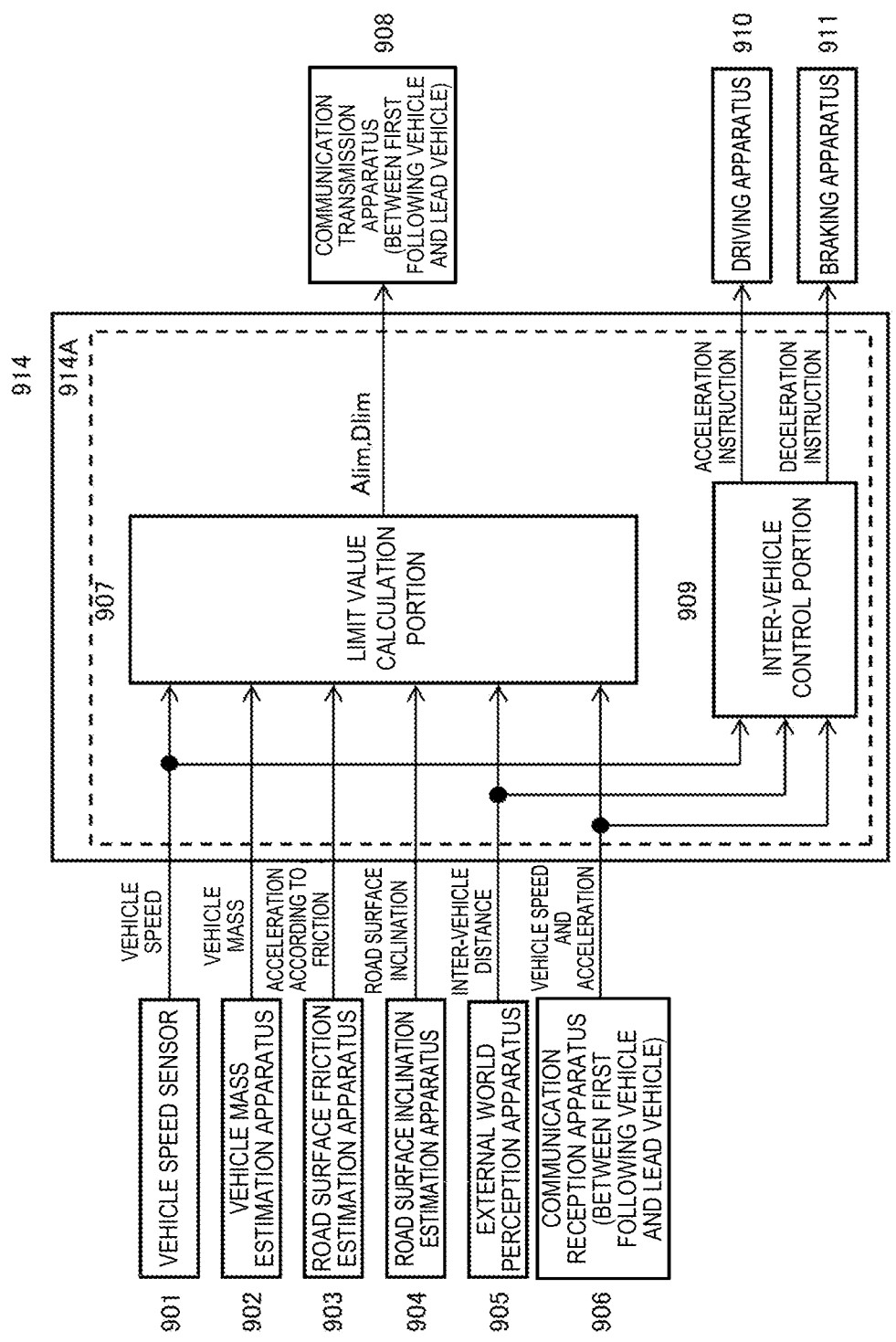
FIG. 13 is a block diagram illustrating a vehicle control system mounted on the following vehicle according to a fourth embodiment.

FIG. 13 is a block diagram illustrating one configuration of a vehicle control system mounted on the first following vehicle 2a in the platoon running carried out by the two vehicles.

The vehicle control system of the first following vehicle 2a includes a vehicle speed sensor 901, a vehicle mass estimation apparatus 902, a road surface friction estimation apparatus 903, a road surface inclination estimation apparatus 904, and an external world perception apparatus 905 for identifying the vehicle speed, the vehicle mass, the road surface friction, the road surface inclination, and the external world information of the first following vehicle 2a.

The vehicle control system of the first following vehicle 2 includes a communication reception apparatus 906, which is a reception apparatus in communication between the lead vehicle 1 and the first following vehicle 2a, to acquire information regarding the vehicle speed and the acceleration of the lead vehicle 1, which corresponds to the immediately preceding vehicle, from the lead vehicle 1.

The above-described vehicle speed sensor 901, vehicle mass estimation apparatus 902, road surface friction estimation apparatus 903, road surface inclination estimation apparatus 904, external world perception apparatus 905, and communication reception apparatus 906 are apparatuses having similar functions to the vehicle speed sensor 202, the vehicle mass estimation apparatus 204, the road surface friction estimation apparatus 205, the road surface inclination estimation apparatus 206, the external world perception apparatus 207, and the communication reception apparatus 208 illustrated in FIG. 2, and therefore the detailed descriptions thereof will be omitted herein.

A vehicle control apparatus 914 includes a control portion 914A that makes a calculation based on the various kinds of information acquired by the above-described apparatuses and outputs a calculated result, and the control portion 914A includes a limit value calculation portion 907 and an inter-vehicle control portion 909.

The limit value calculation portion 907 calculates the acceleration limit value Alim and the deceleration limit value Dlim, and outputs a signal regarding the calculated acceleration limit value Alim and deceleration limit value Dlim to a communication transmission apparatus 908.

Processing for calculating the acceleration limit value Alim and the deceleration limit value Dlim by the limit value calculation portion 907 is performed according to the procedure illustrated in the flowchart of FIG. 3 similarly to the above-described limit value calculation portion 209, and therefore the detailed description thereof will be omitted herein.

The inter-vehicle control portion 909 outputs an acceleration instruction to the driving apparatus 712 of the first following vehicle 2a and outputs a deceleration instruction to the braking apparatus 713 of the first following vehicle 2a to keep the inter-vehicle distance between the first following vehicle 2a and the lead vehicle 1, which corresponds to the immediately preceding vehicle, at a target value.

The processing for outputting the acceleration instruction and the deceleration instruction for the inter-vehicle control by the inter-vehicle control portion 711 is performed in a similar manner to the above-described inter-vehicle control portion 211, and therefore the detailed description thereof will be omitted herein.

The communication transmission apparatus 908 is a transmission apparatus used in communication between the lead vehicle 1 and the first following vehicle 2a, and transmits a signal regarding the acceleration limit value Alim and the deceleration limit value Dlim calculated by the limit value calculation portion 907 of the first following vehicle 2a to the lead vehicle 1.

The vehicle following running system can be configured as a system in which the first following vehicle 2a does not include the limit value calculation portion 907 and the inter-vehicle control portion 909, and the first following vehicle 2a transmits information necessary to exert the functions as the limit value calculation portion 907 and the inter-vehicle control portion 909 to the lead vehicle 1 with use of the communication transmission apparatus 908, thereby causing the lead vehicle 1 to exert the functions as the limit value calculation portion 907 and the inter-vehicle control portion 909.

Figure 14:
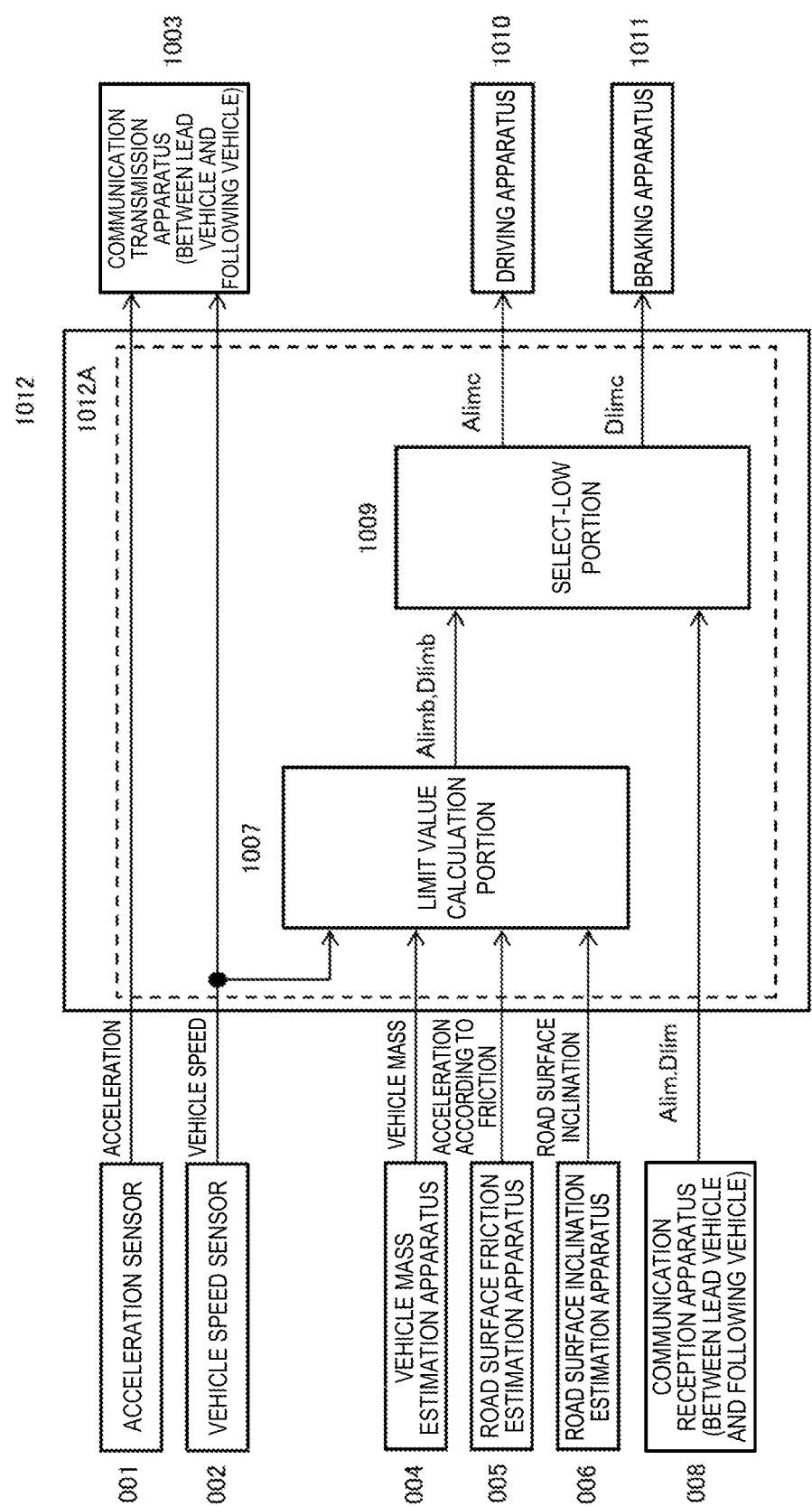
FIG. 14 is a block diagram illustrating a vehicle control system mounted on the lead vehicle according to the fourth embodiment.

FIG. 14 is a block diagram illustrating one configuration of a vehicle control system mounted on the lead vehicle 1 in the platoon running carried out by the two vehicles.

The vehicle control system mounted on the lead vehicle 1 includes an acceleration sensor 1001, a vehicle speed sensor 1002, a vehicle mass estimation apparatus 1004, a road surface friction estimation apparatus 1005, and a road surface inclination estimation apparatus 1006.

They are apparatuses having similar functions to the acceleration sensor 401, the vehicle speed sensor 402, the vehicle mass estimation apparatus 404, the road surface friction estimation apparatus 405, and the road surface inclination estimation apparatus 406 illustrated in FIG. 4, and therefore the detailed descriptions thereof will be omitted herein.

A communication reception apparatus 1008 is a reception apparatus used in communication between the lead vehicle 1 and the first following vehicle 2a, and acquires the signal regarding the acceleration limit value Alim and the deceleration limit value Dlim calculated by the first following vehicle 2a.

A vehicle control apparatus 1012 includes a control portion 1012A that makes a calculation based on the various kinds of information acquired by the above-described vehicle speed sensor 1002 and the like and outputs a calculated result, and the control portion 1012A includes a limit value calculation portion 1007 and a select-low portion 1009, similarly to the vehicle control apparatus 412 illustrated in FIG. 4.

The limit value calculation portion 1007 calculates the basic acceleration limit value (the basic acceleration limit value Alimb and the basic deceleration limit value Dlimb) according to the procedure illustrated in the flowchart of FIG. 5, similarly to the limit value calculation portion 407 illustrated in FIG. 4.

The select-low portion 1009 acquires the basic acceleration limit value Alimb and the basic deceleration limit value Dlimb calculated by the limit value calculation portion 1007, and the acceleration limit value Alim and the deceleration limit value Dlim transmitted from the first following vehicle 2a.

Then, the select-low portion 1009 outputs smaller one of the basic acceleration limit value Alimb and the acceleration limit value Alim as the set acceleration limit value Alimc, and further outputs smaller one of the basic deceleration limit value Dlimb and the deceleration limit value Dlim as the set deceleration limit value Dlimc.

A communication transmission apparatus 1003 is a transmission apparatus used in communication between the lead vehicle 1 and the first following vehicle 2a, and transmits information regarding the vehicle speed and the acceleration of the lead vehicle 1 to the first following vehicle 2a as information used in the inter-vehicle control in the first following vehicle 2a.

A driving apparatus 1010 acquires the signal regarding the set acceleration limit value Alimc from the select-low portion 1009, and imposes a limit on the driving force to be output in such a manner that the acceleration of the lead vehicle 1 does not exceed the set acceleration limit value Alimc, similarly to the driving apparatus 410 illustrated in FIG. 4.

Further, a braking apparatus 1011 acquires the signal regarding the set deceleration limit value Dlimc from the select-low portion 1009, and imposes a limit on the braking force to be output in such a manner that the deceleration of the lead vehicle 1 does not exceed the set deceleration limit value Dlimc, similarly to the braking apparatus 411 illustrated in FIG. 4.

In this manner, even in the platoon formed by two vehicles, namely, the lead vehicle 1 and the first following vehicle 2a, the followability can be improved by limiting the acceleration and the deceleration of the lead vehicle 1 based on the specifications regarding the running of the first following vehicle 2a, which corresponds to the following vehicle.

In other words, the processing that limits the braking/driving force (the acceleration or the deceleration) of the lead vehicle 1 based on the specifications regarding the running of the following vehicle is also applicable to the platoon running carried out by two vehicles, and can improve the followability and improve the accuracy of maintaining the connection similarly to when three or more vehicles carry out the platoon running.

Further, in the case of the platoon running carried out by two vehicles, the control configuration can be simplified compared to the configuration in the case of the platoon formed by three or more vehicles because there is only one following vehicle.

Each technical idea described in the above-described embodiments can be used in combination as appropriate within a range not creating a contradiction.

Having described the contents of the present invention specifically with reference to the preferred embodiments thereof, it is apparent to those skilled in the art that the present invention can be embodied by various modifications based on the basic technical idea and teaching of the present invention.

For example, in the sequential select-low method, the vehicle following running system can pass on the result of the select-low processing from the immediately subsequent vehicle behind the lead vehicle 1 toward the last vehicle and transmit the signal regarding the smallest value among the limit values respectively determined by the following vehicles from the last vehicle to the lead vehicle, and the direction in which the result of the select-low processing is passed on is not limited to the direction from the last vehicle to the lead vehicle.

Further, the vehicle following running system can be configured in the following manner. The following vehicles are divided into groups each formed by a plurality of vehicles. One following vehicle determined for each group collects information regarding the limit values calculated by the other following vehicles in the same group, and selects the smallest value among the limit values including the limit value determined by this vehicle itself and transmits it to the lead vehicle 1. Then, the lead vehicle 1 selects the smallest value among the limit values respectively transmitted from the groups and the basic limit value determined by the lead vehicle 1 itself as the set limit value.

Further, the signal regarding the limit value is supposed to be transmitted from the last following vehicle to the lead vehicle in the collective select-low method, and therefore the vehicle following running system can be configured to be able to switch the select-low method from the collective select-low method to the sequential select-low method if the platoon is long and the communication intensity between the last following vehicle and the lead vehicle falls below a threshold value.

Further, the vehicle following running system can be configured as a system employing information such as the distance from each of the following vehicles to the lead vehicle, the length of the entire platoon (the distance from the last following vehicle to the lead vehicle), the curvature of the road surface on which the vehicles run, whether another vehicle interrupts into the middle of the platoon, the fuel remaining amount and/or the battery remaining amount of each of the vehicles, and whether a change in the traffic lane is ongoing as the specifications regarding the running to be used to calculate the acceleration limit value or the basic acceleration limit value.

Further, the vehicle following running system can be configured to collect the information about the maximum acceleration Amax or the maximum deceleration Dmax of each of the following vehicles to the lead vehicle or the like, select a following vehicle having the smallest maximum acceleration Amax or the smallest maximum deceleration Dmax as a vehicle that calculates the acceleration limit value, cause the selected following vehicle to determine the acceleration limit value Alim or the deceleration limit value Dlim by correcting the limit value based on the maximum acceleration Amax or the maximum deceleration Dmax according to the air resistance and/or the like, and transmit a signal regarding the determined acceleration limit value Alim or deceleration limit value Dlim to the lead vehicle 1, when the platoon is assembled.

Further, the vehicle following running system can be configured as a system in which a vehicle that outputs a request for the acceleration limit value is selected based on information regarding a difference between the inter-vehicle distance and the target value during the platoon running, and, for example, each of the following vehicles can select this vehicle itself as the vehicle that outputs the request for the acceleration limit value when the difference thereof in the inter-vehicle distance reaches or exceeds a threshold value, or the lead vehicle can select the vehicle that outputs the request for the acceleration limit value by collecting information regarding the difference in the inter-vehicle distance in each of the following vehicles.

Further, the vehicle following running system can be configured as a system that limits only any one of the acceleration (the positive acceleration) or the deceleration (the negative acceleration) of the lead vehicle.

In other words, the present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of embodiments can also be implemented with another configuration added, deleted, or replaced with respect to a part of the configuration of this embodiment.

The present application claims priority under the Paris Convention to Japanese Patent Application No. 2019-137604 filed on Jul. 26, 2019. The entire disclosure of Japanese Patent Application No. 2019-137604 filed on Jul. 26, 2019 including the specification, the claims, the drawings, and the abstract is incorporated herein by reference in its entirety.

REFERENCE SIGNS LIST

1 lead vehicle
2 following vehicle
3 first following vehicle
201, 401 acceleration sensor
202, 402 vehicle speed sensor
204, 404 vehicle mass estimation apparatus
205, 405 road surface friction estimation apparatus
206, 406 road surface inclination estimation apparatus
209 limit value calculation portion
210 second communication transmission apparatus
211 inter-vehicle control portion
212, 410 driving apparatus
213, 411 braking apparatus
214, 412 vehicle control apparatus
214A, 412A control portion
407 limit value calculation portion
409 select-low portion

The invention claimed is:

1. A vehicle control apparatus comprising:

a control portion mounted on a lead vehicle and configured to make a calculation based on input information and output a result of the calculation to a braking apparatus or a driving apparatus in a vehicle following running system, the vehicle following running system including a plurality of vehicles including the lead vehicle and a first following vehicle subsequent to the lead vehicle, the plurality of vehicles being configured to carry out following running by being non-mechanically connected, wherein the control portion on the lead vehicle is configured to:

set a first predetermined acceleration limit value predetermined based on specifications regarding running, including the performance and the environment of the first following vehicle and a basic predetermined acceleration limit value predetermined based on specifications regarding running of the lead vehicle by selecting a smaller of the first predetermined acceleration limit value and the basic prede-
termined acceleration limit value, and setting the
selected smaller value as a set acceleration limit
value of the lead vehicle, and output an acceleration instruction for controlling the brak-
ing apparatus or the driving apparatus after limiting it
according to the set acceleration limit value, wherein the specifications regarding the running of the
first following vehicle include:

information regarding a first maximum acceleration,
which is a performance of the first following vehicle,
and a first acceleration determined based on a first relative
distance of the first following vehicle to a preceding
vehicle immediately ahead thereof and a first relative
speed of the first following vehicle to the preceding
vehicle immediately ahead thereof, and wherein the specifications regarding the running of the
lead vehicle include information regarding a basic
maximum acceleration, which is a performance of the
lead vehicle.

2. The vehicle control apparatus according to claim 1,
wherein the first acceleration is an acceleration regarding
driving in a direction for increasing a speed.

3. The vehicle control apparatus according to claim 1,
wherein the first acceleration is an acceleration regarding
braking in a direction for reducing a speed.

4. The vehicle control apparatus according to claim 1,
wherein the basic predetermined acceleration limit value
includes a basic predetermined acceleration limit value
configured to curb a positive acceleration of the lead vehicle
and a basic predetermined deceleration limit value config-
ured to curb a negative acceleration of the lead vehicle.

5. A vehicle control apparatus comprising:

a control portion mounted on a lead vehicle and config-
ured to make a calculation based on input information
and output a result of the calculation to a braking
apparatus or a driving apparatus in a vehicle following
running system, the vehicle following running system
including a plurality of vehicles including the lead
vehicle, a first following vehicle subsequent to the lead
vehicle, and a second following vehicle subsequent to
the first following vehicle, the plurality of vehicles
being configured to carry out following running by
being non-mechanically connected, wherein the control portion on the lead vehicle is config-
ured to:

set a first predetermined acceleration limit value prede-
termined-based on specifications regarding running,
including the performance and the environment of the
first following vehicle, a second predetermined accel-
eration limit value predetermined-based on specifica-
tions regarding running, including the performance and
the environment of the second following vehicle, and a
basic predetermined acceleration limit value predeter-
mined based on specifications regarding running of the
lead vehicle by selecting a smaller of the first prede-
termined acceleration limit value, the second predeter-
mined acceleration limit value, and the basic predeter-
mined acceleration limit value, and setting the selected
smaller value as a set acceleration limit value of the
lead vehicle, and output an acceleration instruction for controlling the brak-
ing apparatus or the driving apparatus after limiting it
according to the set acceleration limit value, wherein the specifications regarding the running of the
first following vehicle include:

information regarding a first maximum acceleration,
which is a performance of the first following vehicle,
and a first acceleration determined based on a first relative
distance of the first following vehicle to a preceding
vehicle immediately ahead thereof and a first relative
speed of the first following vehicle to the preceding
vehicle immediately ahead thereof, wherein the specifications regarding the running of the
second following vehicle include:

information regarding a second maximum acceleration,
which is a performance of the second following
vehicle, and a second acceleration determined based on a second
relative distance of the second following vehicle to a
preceding vehicle immediately ahead thereof and a
second relative speed of the second following vehicle
to the preceding vehicle immediately ahead thereof,
and wherein the specifications regarding the running of the
lead vehicle include information regarding a basic
maximum acceleration, which is a performance of the
lead vehicle.

6. The vehicle control apparatus according to claim 5,
wherein the basic predetermined acceleration limit value
includes a basic predetermined acceleration limit value
configured to curb a positive acceleration of the lead vehicle
and a basic predetermined deceleration limit value config-
ured to curb a negative acceleration of the lead vehicle.

7. A vehicle control apparatus comprising:

a control portion mounted on a lead vehicle and config-
ured to make a calculation based on input information
and output a result of the calculation to a braking
apparatus or a driving apparatus in a vehicle following
running system, the vehicle following running system
including a plurality of vehicles including the lead
vehicle, a first following vehicle subsequent to the lead
vehicle, and a second following vehicle subsequent to
the first following vehicle, the plurality of vehicles
being configured to carry out following running by
being non-mechanically connected, wherein the control portion on the lead vehicle is config-
ured to:

set a first predetermined acceleration limit value prede-
termined based on specifications regarding running,
including the performance and the environment of the
first following vehicle, a second predetermined accel-
eration limit value predetermined based on specifica-
tions regarding running, including the performance and
the environment of the second following vehicle, and a
basic predetermined acceleration limit value predeter-
mined based on specifications regarding running of the
lead vehicle by selecting a smaller of the first prede-
termined acceleration limit value, the second predeter-
mined acceleration limit value, and the basic predeter-
mined acceleration limit value, and setting the selected
smaller value as a set acceleration limit value of the
lead vehicle, output an acceleration instruction for
controlling the braking apparatus or the driving appa-
ratus after limiting it according to the set acceleration
limit value, acquire the first predetermined acceleration limit value
transmitted from the first following vehicle,
and acquire the second predetermined acceleration limit value
transmitted from the second following vehicle.

8. The vehicle control apparatus according to claim 7, wherein the basic predetermined acceleration limit value includes a basic predetermined acceleration limit value configured to curb a positive acceleration of the lead vehicle and a basic predetermined deceleration limit value configured to curb a negative acceleration of the lead vehicle.

9. A vehicle control method performed by a vehicle control apparatus mounted on a lead vehicle in a vehicle following running system, the vehicle following running system including a plurality of vehicles including the lead vehicle and a first following vehicle subsequent to the lead vehicle, the plurality of vehicles being configured to carry out following running by being non-mechanically connected, the vehicle control method comprising:

using the control apparatus mounted on the lead vehicle to:

set a first predetermined acceleration limit value predetermined based on specifications regarding running, including the performance and the environment of the first following vehicle and a basic predetermined acceleration limit value predetermined based on specifications regarding running of the lead vehicle by selecting a smaller of the first predetermined acceleration limit value and the basic predetermined acceleration limit value, and setting the selected smaller value as a set acceleration limit value of the lead vehicle, and output an acceleration instruction for controlling a braking apparatus or a driving apparatus of the lead vehicle after limiting it according to the set acceleration limit value, wherein the specifications regarding the running of the first following vehicle include:

information regarding a first maximum acceleration, which is a performance of the first following vehicle, and a first acceleration determined based on a first relative distance of the first following vehicle to a preceding vehicle immediately ahead thereof and a first relative speed of the first following vehicle to the preceding vehicle immediately ahead thereof, and wherein the specifications regarding the running of the lead vehicle include information regarding a basic maximum acceleration, which is a performance of the lead vehicle.

10. The vehicle control method according to claim 9, wherein the basic predetermined acceleration limit value includes a basic predetermined acceleration limit value configured to curb a positive acceleration of the lead vehicle and a basic predetermined deceleration limit value configured to curb a negative acceleration of the lead vehicle.

11. A vehicle following running system comprising:

a plurality of vehicles including a lead vehicle and a first following vehicle subsequent to the lead vehicle, the plurality of vehicles being configured to carry out following running by being non-mechanically connected, wherein the lead vehicle includes a control portion, and the control portion in the lead vehicle is configured to:

set a first predetermined acceleration limit value predetermined based on specifications regarding running, including the performance and the environment of the first following vehicle and a basic predetermined acceleration limit value predetermined based on specifications regarding running of the lead vehicle by selecting a smaller of the first predetermined acceleration limit value and the basic predetermined acceleration limit value, and setting the selected smaller value as a set acceleration limit value of the lead vehicle, and output an acceleration instruction for controlling an acceleration of the lead vehicle after limiting it according to the set acceleration limit value; and a braking apparatus or a driving apparatus configured to acquire the acceleration instruction output from the control portion, wherein the specifications regarding the running of the first following vehicle include:

information regarding a first maximum acceleration, which is a performance of the first following vehicle, and a first acceleration determined based on a first relative distance of the first following vehicle to a preceding vehicle immediately ahead thereof and a first relative speed of the first following vehicle to the preceding vehicle immediately ahead thereof, and wherein the specifications regarding the running of the lead vehicle include information regarding a basic maximum acceleration, which is a performance of the lead vehicle.

12. The vehicle following running system according to claim 11, wherein the basic predetermined acceleration limit value includes a basic predetermined acceleration limit value configured to curb a positive acceleration of the lead vehicle and a basic predetermined deceleration limit value configured to curb a negative acceleration of the lead vehicle.

* * * * *